United States Patent
Li et al.

(10) Patent No.: US 11,968,565 B2
(45) Date of Patent: Apr. 23, 2024

(54) USER PLANE INFORMATION REPORTING METHOD AND APPARATUS

(71) Applicant: HUAWEI TECHNOLOGIES CO., LTD., Guangdong (CN)

(72) Inventors: Yongcui Li, Beijing (CN); Yizhuang Wu, Beijing (CN); Haiyang Sun, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 17/675,763

(22) Filed: Feb. 18, 2022

(65) Prior Publication Data
US 2022/0174546 A1 Jun. 2, 2022

Related U.S. Application Data

(63) Continuation of application No. PCT/CN2020/110070, filed on Aug. 19, 2020.

(30) Foreign Application Priority Data

Aug. 21, 2019 (CN) .......................... 201910774976.7

(51) Int. Cl.
*H04W 28/12* (2009.01)
*H04L 67/141* (2022.01)

(52) U.S. Cl.
CPC ............ *H04W 28/12* (2013.01); *H04L 67/141* (2013.01)

(58) Field of Classification Search
CPC ....... H04L 67/00; H04L 67/14; H04L 67/141; H04L 47/825; H04L 61/2592;
(Continued)

(56) References Cited

U.S. PATENT DOCUMENTS

2012/0246325 A1* 9/2012 Pancorbo Marcos ... H04L 43/00
709/227
2012/0327893 A1* 12/2012 Yuan ..................... H04W 24/10
370/329
(Continued)

FOREIGN PATENT DOCUMENTS

CN 108738086 A 11/2018
CN 109673060 A 4/2019
(Continued)

OTHER PUBLICATIONS

Extended European Search Report issued in European Application No. 20854694.5 dated Sep. 14, 2022, 13 pages.
3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.
(Continued)

*Primary Examiner* — Warner Wong
(74) *Attorney, Agent, or Firm* — Fish & Richardson P.C.

(57) ABSTRACT

The present disclosure relates to user plane information reporting methods and apparatus. In one example method, a session management network element obtains parameter information, and initiates establishment of a dedicated tunnel between a first communications apparatus and a second communications apparatus, where the parameter information indicates the first communications apparatus to report user plane information when a reporting condition is met. The session management network element sends a first rule to the first communications apparatus, where the first rule indicates the first communications apparatus to send a packet to the second communications apparatus through the dedicated tunnel when the reporting condition is met.

20 Claims, 11 Drawing Sheets

(58) Field of Classification Search
CPC ........... H04L 65/1066; H04L 65/1069; H04W 76/12; H04W 80/00; H04W 80/10
See application file for complete search history.

(56) References Cited

U.S. PATENT DOCUMENTS

| | | | |
|---|---|---|---|
| 2019/0132251 A1* | 5/2019 | Dao ..................... | H04L 69/22 |
| 2019/0149365 A1 | 5/2019 | Chatterjee et al. | |
| 2019/0207778 A1 | 7/2019 | Qiao et al. | |
| 2019/0223135 A1 | 7/2019 | Park et al. | |
| 2019/0253917 A1* | 8/2019 | Dao ..................... | H04M 15/00 |
| 2019/0268973 A1* | 8/2019 | Bull ..................... | H04W 92/02 |
| 2020/0015129 A1* | 1/2020 | Lee ..................... | H04W 36/0022 |
| 2020/0053828 A1* | 2/2020 | Bharatia ............... | H04W 76/11 |
| 2020/0404497 A1* | 12/2020 | Yuan .................... | H04W 12/72 |
| 2020/0404547 A1* | 12/2020 | Qiao ..................... | H04W 24/06 |
| 2021/0014765 A1* | 1/2021 | Shan .................... | H04W 36/14 |
| 2021/0136719 A1* | 5/2021 | Kim ...................... | H04W 60/04 |
| 2021/0274389 A1* | 9/2021 | Wang ................... | H04L 43/0858 |
| 2021/0345108 A1* | 11/2021 | Li ......................... | H04W 72/53 |
| 2021/0345150 A1* | 11/2021 | Xu ........................ | H04W 24/10 |
| 2022/0103207 A1* | 3/2022 | Miao ..................... | H04B 7/024 |
| 2022/0200813 A1* | 6/2022 | Thiebaut ............... | H04M 15/00 |

FOREIGN PATENT DOCUMENTS

| | | | | |
|---|---|---|---|---|
| CN | 109792788 A | | 5/2019 | |
| CN | 109842558 A | | 6/2019 | |
| CN | 115426677 | * | 12/2022 | ............ H04W 28/08 |
| WO | WO-2018137489 A1 | * | 8/2018 | ............ H04W 24/02 |
| WO | 2018174509 A1 | | 9/2018 | |

OTHER PUBLICATIONS

Baker et al., "IETF Recommendations Regarding Active Queue Management," Network Working Group, Request for Comments: 7567, Jul. 2015, 31 pages.

Huawei, HiSilicon, "Update procedures related to redundant transmission," 3GPP TSG-SA2 Meeting #132, S2-1904763, Xi'an, China, Apr. 8-12, 2019, 15 pages.

Office Action issued in Chinese Application No. 201910774976.7 dated Nov. 25, 2021, 15 pages (with English translation).

ORANGE, Huawei, NEC, "Analytics Exposure and Data Collection," 3GPP TSG-SA WG2 Meeting #132, S2-1904793, Xi'an, China, Apr. 8-12, 2019, 4 pages.

PCT International Search Report and Written Opinion issued in International Application No. PCT/CN2020/110070 dated Nov. 30, 2020, 19 pages (with English translation).

Ramakrishnan et al., "The Addition of Explicit Congestion Notification (ECN) to IP," Network Working Group, Request for Comments: 3168, Sep. 2001, 63 pages.

Samsung, "Update PDU Session Establishment procedure regarding solution 4 in 23.725," 3GPP TSG-SA2 Meeting #133, S2-1905627, Reno, USA, May 13-17, 2019, 12 pages.

T-Mobile USA, Nokia, Nokia Shanghai Bell, "Addition of UE IP address Allocation by UPF," SA WG2 Meeting #131, S2-1902235, Santa Cruz de Tenerife, Spain, Feb. 25-Mar. 1, 2019, 13 pages.

Vencore Labs, OEC, AT&T, T-Mobile USA, Sprint, "SMF exemption to NAS level congestion control for high priority access," 3GPP TSG-SA WG2 Meeting #127-Bis, S2-185151, Newport Beach, USA, May 28-Jun. 1, 2018, 12 pages.

* cited by examiner

USER PLANE INFORMATION REPORTING METHOD AND APPARATUS

CROSS-REFERENCE TO RELATED APPLICATIONS

This application is a continuation of International Application No. PCT/CN2020/110070, filed on Aug. 19, 2020, which claims priority to Chinese Patent Application No. 201910774976.7, filed on Aug. 21, 2019. The disclosures of the aforementioned applications are hereby incorporated by reference in their entireties.

TECHNICAL FIELD

This application relates to the field of communications technologies, and in particular, to a user plane information reporting method and an apparatus.

BACKGROUND

The rapid development of mobile communications promotes continuous emergence of various new services. In addition to the conventional mobile broadband and internet of things, mobile communications also spawns many new application fields, such as augmented reality (augmented reality, AR), virtual reality (virtual reality, VR), the internet of vehicles, industrial control, and the internet of things (Internet of things, IoT). In addition, a higher requirement for performance such as network bandwidth and a delay is also posed, and network load is further increased.

To effectively meet requirements for high bandwidth and a low delay for the rapid development of a mobile internet and the internet of things and reduce the network load, the European Telecommunications Standards Institute (European telecommunication standard institute, ETSI) proposed mobile edge computing (mobile edge computing, MEC) in 2014. MEC is a technology for deeply integrating a base station and an internet service based on a 5G evolution architecture. FIG. 1 shows a 5G architecture-based MEC solution. In the 5G architecture-based MEC solution, MEC is deployed at a sinking user plane network element (User Plane Function, UPF) (namely, a local UPF), for example, in a deployment manner shown by a connection line in FIG. 1, and compared with a conventional deployment manner, a service server provided by MEC is closer to users and can provide a low-delay and high-bandwidth service for the users.

However, in an MEC scenario, if MEC is deployed at the sinking UPF, because an access and mobility management network element (access and mobility management function, AMF) and a policy control network element (policy control function, PCF) are deployed at a relatively high position (that is, far from the users), if user plane information is still reported based on an existing path (radio access network (radio access network, RAN) RAN—AMF—session management network element (session management function, SMF)—PCF—application function (Application Function, AF)), the AF or the PCF may not adjust a bit rate or a policy in time based on RAN information because a reporting path is relatively long. As a result, packet transmission is affected, for example, a packet loss occurs, affecting user service experience.

SUMMARY

Embodiments of this application provide a user plane information reporting method and an apparatus, to improve user plane information reporting efficiency.

According to a first aspect, an embodiment of this application provides a user plane information reporting method, including: obtaining, by a session management network element, parameter information, and initiating, by the session management network element, establishment of a dedicated tunnel between a first communications apparatus and a second communications apparatus, where the dedicated tunnel is used to transmit user plane information, and the parameter information is used by the session management network element to indicate the first communications apparatus to report the user plane information when a reporting condition is met; and sending, by the session management network element, a first rule to the first communications apparatus based on the parameter information, where the first rule is used to indicate the first communications apparatus to send a packet to the second communications apparatus through the dedicated tunnel when the reporting condition is met, and the packet is used to indicate the user plane information.

According to the foregoing method, after obtaining the parameter information, the session management network element initiates the establishment of the dedicated tunnel between the first communications apparatus and the second communications apparatus, and sends the first rule to the first communications apparatus, where the first rule is used to indicate the first communications apparatus to send the packet to the second communications apparatus through the dedicated tunnel when the reporting condition is met. Therefore, the second communications apparatus does not need to always detect whether the packet includes the user plane information, but only needs to detect whether the packet is received through the dedicated tunnel, to determine reporting of the user plane information, thereby simplifying a logical function of the second communications apparatus.

In a possible design, the method further includes: sending, by the session management network element, a second rule to the second communications apparatus, where the second rule is used to indicate the second communications apparatus to send the user plane information to a third communications apparatus when the second communications apparatus receives the packet from the first communications apparatus through the dedicated tunnel.

According to the foregoing design, the second communications apparatus does not need to always detect whether the packet includes the user plane information, but only needs to detect whether the packet is received through the dedicated tunnel, to determine reporting of the user plane information, thereby simplifying the logical function of the second communications apparatus.

In a possible design, the method further includes: sending, by the session management network element, a third rule to the first communications apparatus, where the third rule is used to indicate the first communications apparatus to send a service flow packet to the second communications apparatus through a tunnel other than the dedicated tunnel when the reporting condition is not met.

According to the foregoing design, the first communications apparatus sends the service flow packet through an existing tunnel when the reporting condition is not met.

In a possible design, the packet is the service flow packet or a packet generated by the first communications apparatus.

According to the foregoing design, there may be a plurality of possible cases for the packet reported by the first communications apparatus.

In a possible design, the method further includes: if the packet is the packet generated by the first communications apparatus, sending, by the session management network element, indication information to the first communications apparatus, where the indication information is used to indicate the first communications apparatus to generate the packet when the reporting condition is met.

According to the foregoing design, the session management network element may indicate the first communications apparatus to report the generated packet when the reporting condition is met.

In a possible design, the session management network element receives the parameter information from an application function network element by using a policy control network element.

According to the foregoing design, the AF can dynamically modify a session policy, so that higher flexibility is achieved.

In a possible design, the user plane information includes at least one of notification information, congestion information, a packet loss rate, or delay information.

It should be understood that the user plane information may include but is not limited to the foregoing content. The notification information may be specifically a service flow identifier. The congestion information may be specifically a congestion level. The packet loss rate may be specifically a packet loss status of a packet. The delay may be specifically a delay corresponding to packet transmission on an air interface.

In a possible design, if the first communications apparatus is an access network element, the second communications apparatus is a user plane network element; or if the first communications apparatus is a user plane network element, the second communications apparatus is an access network element.

According to the foregoing design, the access network element may report user plane information in an uplink direction to the user plane network element, or the user plane network element may report user plane information in an uplink direction to the access network element.

In a possible design, if the first communications apparatus is the access network element, the second communications apparatus is the user plane network element, and the third communications apparatus is a policy control network element or an application function network element; or if the first communications apparatus is the user plane network element, the second communications apparatus is the access network element, and the third communications apparatus is a terminal apparatus.

According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

In a possible design, the sending, by the session management network element, a first rule to the first communications apparatus based on the parameter information includes: sending, by the session management network element, a tunnel establishment request message to the first communications apparatus, where the tunnel establishment request message includes the first rule.

According to the foregoing design, the session management network element may send the first rule to the first communications apparatus by using the tunnel establishment request. In addition, the tunnel establishment request may further include the third rule.

In a possible design, the session management network element sends a tunnel establishment request message to the second communications apparatus, where the tunnel establishment request message includes the second rule.

According to the foregoing design, the session management network element may send the second rule to the second communications apparatus by using the tunnel establishment request.

According to a second aspect, an embodiment of this application provides a user plane information reporting method. The method includes: receiving, by a first communications apparatus, a first rule from a session management network element, where the first rule is used to indicate the first communications apparatus to send a packet to a second communications apparatus through a dedicated tunnel when a reporting condition is met, and the packet is used to indicate user plane information; and sending, by the first communications apparatus, the packet to the second communications apparatus through the dedicated tunnel when the reporting condition is met.

According to the foregoing method, the first communications apparatus sends the packet to the second communications apparatus through the dedicated tunnel when the reporting condition is met. Therefore, the second communications apparatus does not need to always detect whether the packet includes the user plane information, but only needs to detect whether the packet is received through the dedicated tunnel, to determine reporting of the user plane information, thereby simplifying a logical function of the second communications apparatus.

In a possible design, the method further includes: receiving, by the first communications apparatus, a third rule from the session management network element, where the third rule is used to indicate the first communications apparatus to send a service flow packet to the second communications apparatus through a tunnel other than the dedicated tunnel when the reporting condition is not met.

According to the foregoing design, the first communications apparatus sends the service flow packet through an existing tunnel when the reporting condition is not met.

In a possible design, the packet is the service flow packet or a packet generated by the first communications apparatus.

According to the foregoing design, there may be a plurality of possible cases for the packet reported by the first communications apparatus.

In a possible design, if the packet is the packet generated by the first communications apparatus, the method further includes:

receiving, by the first communications apparatus, indication information from the session management network element, where the indication information is used to indicate the first communications apparatus to generate the packet when the reporting condition is met.

According to the foregoing design, the session management network element may indicate the first communications apparatus to report the generated packet when the reporting condition is met.

In a possible design, the user plane information includes at least one of notification information, congestion information, a packet loss rate, or delay information.

In a possible design, if the first communications apparatus is an access network element, the second communications apparatus is a user plane network element; or if the first communications apparatus is a user plane network element, the second communications apparatus is an access network element.

According to the foregoing design, the access network element may report user plane information in an uplink direction to the user plane network element, or the user plane network element may report user plane information in an uplink direction to the access network element.

In a possible design, the first communications apparatus receives a tunnel establishment request message from the session management network element, where the tunnel establishment request message includes the first rule.

According to the foregoing design, the session management network element may send the first rule to the first communications apparatus by using the tunnel establishment request. In addition, the tunnel establishment request may further include the third rule.

According to a third aspect, an embodiment of this application provides a user plane information reporting method. The method includes: receiving, by a second communications apparatus, a second rule from a session management network element, where the second rule is used to indicate the second communications apparatus to send user plane information to a third communications apparatus when the second communications apparatus receives a packet from a first communications apparatus through a dedicated tunnel; and sending, by the second communications apparatus, the user plane information to the third communications apparatus when the second communications apparatus receives the packet from the first communications apparatus through the dedicated tunnel, where the packet is used to indicate the user plane information.

According to the foregoing method, the second communications apparatus does not need to always detect whether the packet includes the user plane information, but only needs to detect whether the packet is received through the dedicated tunnel, to determine reporting of the user plane information, thereby simplifying the logical function of the second communications apparatus.

In a possible design, the packet is a service flow packet or a packet generated by the first communications apparatus.

According to the foregoing design, there may be a plurality of possible cases for the packet reported by the first communications apparatus.

In a possible design, the user plane information includes at least one of notification information, congestion information, a packet loss rate, or delay information.

In a possible design, if the first communications apparatus is an access network element, the second communications apparatus is a user plane network element, and the third communications apparatus is a policy control network element or an application function network element; or if the first communications apparatus is a user plane network element, the second communications apparatus is an access network element, and the third communications apparatus is a terminal apparatus.

According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

In a possible design, the second communications apparatus receives a tunnel establishment request message from the session management network element, where the tunnel establishment request message includes the second rule.

According to the foregoing design, the session management network element may send the second rule to the second communications apparatus by using the tunnel establishment request.

According to a fourth aspect, an embodiment of this application provides a user plane information reporting method. The method includes:

obtaining, by a session management network element, parameter information, where the parameter information is used by the session management network element to indicate a first communications apparatus to report user plane information when a reporting condition is met; sending, by the session management network element, a fourth rule to the first communications apparatus based on the parameter information, where the fourth rule is used to indicate the first communications apparatus to send a packet including a dedicated quality of service flow identifier QFI to a second communications apparatus when the reporting condition is met, and the packet including the dedicated QFI is used to indicate the user plane information; and sending, by the session management network element, a fifth rule to the first communications apparatus, where the fifth rule is used to indicate the first communications apparatus to send a packet including a QFI to the second communications apparatus when the reporting condition is not met.

According to the foregoing method, after obtaining the parameter information, the session management network element sends the fourth rule and the fifth rule to the first communications apparatus, where the fourth rule is used to indicate the first communications apparatus to send the packet including the dedicated QFI to the second communications apparatus when the reporting condition is met, and the fifth rule is used to indicate the first communications apparatus to send a packet including a QFI to the second communications apparatus when the reporting condition is not met. Therefore, when the second communications apparatus receives the packet including the dedicated QFI or the QFI from the first communications apparatus, the second communications apparatus determines whether the first communications apparatus reports the user plane information. In addition, reporting of the user plane information uses an existing packet header protocol of the packet. Compared with the conventional technology, there is no need to extend a GTP-U protocol, thereby simplifying a protocol design.

In a possible design, the method further includes: sending, by the session management network element, a sixth rule to the second communications apparatus, where the sixth rule is used to indicate the second communications apparatus to send the user plane information to a third communications apparatus when the second communications apparatus receives the packet including the dedicated QFI from the first communications apparatus.

According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

In a possible design, the method further includes: sending, by the session management network element, a correspondence between a dedicated QFI and a QFI to the first communications apparatus and the second communications apparatus.

According to the foregoing design, when the first communications apparatus detects that a reporting condition is met for a service flow and user plane information needs to be reported, the first communications apparatus includes a dedicated QFI corresponding to a QFI of the service flow in a packet to be sent to the second communications apparatus. The second communications apparatus may determine, based on the packet including the dedicated QFI that is received from the first communications apparatus, a QFI corresponding to the dedicated QFI, and further determine the service flow in which the user plane information needs to be reported.

In a possible design, the sixth rule is used to indicate the second communications apparatus to determine, based on the correspondence, user plane information of a QFI corresponding to the dedicated QFI, and send the user plane information to the third communications apparatus when the second communications apparatus receives the packet including the dedicated QFI.

According to the foregoing design, the second communications apparatus may determine, based on the packet including the dedicated QFI that is received from the first communications apparatus, the QFI corresponding to the dedicated QFI, and further determine the service flow in which the user plane information that needs to be reported, and send the service flow to the third communications apparatus in time.

In a possible design, the packet including the dedicated QFI is a service flow packet or a packet generated by the first communications apparatus.

According to the foregoing design, there may be a plurality of possible cases for the packet reported by the first communications apparatus.

In a possible design, the method further includes: if the packet including the dedicated QFI is the packet generated by the first communications apparatus, sending, by the session management network element, indication information to the first communications apparatus, where the indication information is used to indicate the first communications apparatus to generate the packet including the dedicated QFI when the reporting condition is met.

According to the foregoing design, the session management network element may indicate the first communications apparatus to report the generated packet when the reporting condition is met.

In a possible design, the session management network element receives the parameter information from an application function network element by using a policy control network element.

According to the foregoing design, the AF can dynamically modify a session policy, so that higher flexibility is achieved.

In a possible design, the user plane information includes at least one of notification information, congestion information, a packet loss rate, or delay information.

It should be understood that the user plane information may include but is not limited to the foregoing content. The notification information may be specifically a service flow identifier. The congestion information may be specifically a congestion level. The packet loss rate may be specifically a packet loss status of a packet. The delay may be specifically a delay corresponding to packet transmission on an air interface.

In a possible design, if the first communications apparatus is an access network element, the second communications apparatus is a user plane network element; or if the first communications apparatus is a user plane network element, the second communications apparatus is an access network element.

According to the foregoing design, the access network element may report user plane information in an uplink direction to the user plane network element, or the user plane network element may report user plane information in an uplink direction to the access network element.

In a possible design, if the first communications apparatus is the access network element, the second communications apparatus is the user plane network element, and the third communications apparatus is a policy control network element or an application function network element; or if the first communications apparatus is the user plane network element, the second communications apparatus is the access network element, and the third communications apparatus is a terminal apparatus.

According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

According to a fifth aspect, an embodiment of this application provides a user plane information reporting method. The method includes: receiving, by a first communications apparatus, a fourth rule and a fifth rule from a session management network element, where the fourth rule is used to indicate the first communications apparatus to send a packet including a dedicated QFI to a second communications apparatus when a reporting condition is met, the packet including the dedicated QFI is used to indicate user plane information, and the fifth rule is used to indicate the first communications apparatus to send the packet including the QFI to the second communications apparatus when the reporting condition is not met; sending, by the first communications apparatus, the packet including the dedicated QFI to the second communications apparatus when the reporting condition is met; and sending, by the first communications apparatus the packet including the QFI to the second communications apparatus when the reporting condition is met.

According to the foregoing method, after obtaining the parameter information, the session management network element sends the fourth rule and the fifth rule to the first communications apparatus, where the fourth rule is used to indicate the first communications apparatus to send the packet including the dedicated QFI to the second communications apparatus when the reporting condition is met, and the fifth rule is used to indicate the first communications apparatus to send a packet including a QFI to the second communications apparatus when the reporting condition is not met. Therefore, when the second communications apparatus receives the packet including the dedicated QFI or the QFI from the first communications apparatus, the second communications apparatus determines whether the first communications apparatus reports the user plane information. In addition, reporting of the user plane information uses an existing packet header protocol of the packet. Compared with the conventional technology, there is no need to extend a GTP-U protocol, thereby simplifying a protocol design.

In a possible design, the method further includes: receiving, by the first communications apparatus, a correspondence between a dedicated QFI and a QFI from the session management network element.

According to the foregoing design, when the first communications apparatus detects that a reporting condition is met for a service flow and user plane information needs to be reported, the first communications apparatus includes a dedicated QFI corresponding to a QFI of the service flow in a packet to be sent to the second communications apparatus.

In a possible design, the packet including the dedicated QFI is a service flow packet or a packet generated by the first communications apparatus.

According to the foregoing design, there may be a plurality of possible cases for the packet reported by the first communications apparatus.

In a possible design, if the packet including the dedicated QFI is the packet generated by the first communications apparatus, the first communications apparatus receives indication information from the session management network element, where the indication information is used to indicate the first communications apparatus to generate the packet including the dedicated QFI when the reporting condition is met.

According to the foregoing design, the session management network element may indicate the first communications apparatus to report the generated packet when the reporting condition is met.

In a possible design, the user plane information includes at least one of notification information, congestion information, a packet loss rate, or delay information.

In a possible design, if the first communications apparatus is an access network element, the second communications apparatus is a user plane network element; or if the first communications apparatus is a user plane network element, the second communications apparatus is an access network element.

According to the foregoing design, the access network element may report user plane information in an uplink direction to the user plane network element, or the user plane network element may report user plane information in an uplink direction to the access network element.

According to a sixth aspect, an embodiment of this application provides a user plane information reporting method. The method includes:

receiving, by a second communications apparatus, a sixth rule from a session management network element, where the sixth rule is used to indicate the second communications apparatus to send user plane information to a third communications apparatus when the second communications apparatus receives a packet including a dedicated QFI from a first communications apparatus, and the packet including the dedicated QFI is used to indicate the user plane information; and sending, by the second communications apparatus the user plane information to the third communications apparatus when the second communications apparatus receives the packet including the dedicated QFI from the first communications apparatus.

According to the foregoing method, after obtaining the parameter information, the session management network element sends the sixth rule to the second communications apparatus. Therefore, when the second communications apparatus receives the packet including the dedicated QFI or a QFI from the first communications apparatus, the second communications apparatus determines whether the first communications apparatus reports the user plane information. In addition, reporting of the user plane information uses an existing packet header protocol of the packet. Compared with the conventional technology, there is no need to extend a GTP-U protocol, thereby simplifying a protocol design.

In a possible design, the method further includes: receiving, by the second communications apparatus, a correspondence between a dedicated QFI and a QFI from the session management network element.

According to the foregoing design, the second communications apparatus may determine, based on the packet including the dedicated QFI that is received from the first communications apparatus, a QFI corresponding to the dedicated QFI, and further determine a service flow in which the user plane information needs to be reported.

In a possible design, the sixth rule is used to indicate the second communications apparatus to determine, based on the correspondence, user plane information of a QFI corresponding to the dedicated QFI, and send the user plane information to the third communications apparatus when the second communications apparatus receives the packet including the dedicated QFI from the first communications apparatus.

According to the foregoing design, the second communications apparatus may determine, based on the packet including the dedicated QFI that is received from the first communications apparatus, the QFI corresponding to the dedicated QFI, and further determine the service flow in which the user plane information needs to be reported, and send the service flow to the third communications apparatus in time.

In a possible design, the packet including the dedicated QFI is a service flow packet or a packet generated by the first communications apparatus.

According to the foregoing design, there may be a plurality of possible cases for the packet reported by the first communications apparatus.

In a possible design, the user plane information includes at least one of notification information, congestion information, a packet loss rate, or delay information.

In a possible design, if the first communications apparatus is an access network element, the second communications apparatus is a user plane network element, and the third communications apparatus is a policy control network element or an application function network element; or if the first communications apparatus is a user plane network element, the second communications apparatus is an access network element, and the third communications apparatus is a terminal apparatus.

According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

According to a seventh aspect, an embodiment of this application provides a user plane information reporting method. The method includes: generating, by an application function network element, parameter information; and sending, by the application function network element, the parameter information to a session management network element by using a policy control network element, where the parameter information is used by the session management network element to indicate a first communications apparatus to report user plane information when a reporting condition is met.

According to the foregoing design, the AF can dynamically modify a session policy, so that higher flexibility is achieved.

According to an eighth aspect, an embodiment of this application provides a user plane information reporting method. The method includes: generating, by a session management network element, a seventh rule, and sending, by the session management network element, the seventh rule to a traffic steering point, where the seventh rule indicates the traffic steering point to separately send received user plane information to a local anchor and a remote anchor, and the user plane information indicates that none of service flows of a terminal apparatus can meet a requirement.

According to a ninth aspect, an embodiment of this application provides a user plane information reporting method. The method includes: receiving, by a traffic steering point, a seventh rule from a session management network element, where the seventh rule indicates the traffic steering point to separately send received user plane information to a local anchor and a remote anchor, and the user plane information indicates that none of service flows of a terminal apparatus can meet a requirement; and receiving, by the traffic steering point, the user plane information, and separately sending the user plane information to the local anchor and the remote anchor.

The foregoing method can resolve a congestion reporting problem in a traffic steering scenario, and ensure timely reporting of the user plane information.

It should be noted that the foregoing method is applicable to a scenario in which none of the service flows of the terminal apparatus can meet the requirement, for example, congestion occurs in all QoS flows of UE because a RAN is congested or a RAN cell is congested, or an air interface delay cannot meet a delay requirement of a service flow of UE due to some reason, or all or none of QoS flows of UE can meet a QoS requirement. In other words, the solution in this embodiment of this application is not applicable to congestion of a service flow. For example, in a scenario in which a service flow is congested, the SMF does not need to deliver the seventh rule to a ULCL/BP. When the ULCL or the BP receives an uplink service flow, the ULCL or the BP sends the uplink service flow to a corresponding anchor according to a forwarding rule.

According to a tenth aspect, an embodiment of this application further provides a communications system. The system includes a session management network element, a first communications apparatus, and a second communications apparatus. The session management network element performs the method according to any one of the first aspect or the possible designs of the first aspect; the first communications apparatus performs the method according to any one of the second aspect or the possible designs of the second aspect; and the second communications apparatus performs the method according to any one of the third aspect or the possible designs of the third aspect, or the session management network element performs the method according to any one of the fourth aspect or the possible designs of the fourth aspect; the first communications apparatus performs the method according to any one of the fifth aspect or the possible designs of the fifth aspect; and the second communications apparatus performs the method according to any one of the sixth aspect or the possible designs of the sixth aspect.

In a possible design, the system further includes a policy control network element and an application function network element, and the application function network element performs the first aspect.

According to an eleventh aspect, an embodiment of this application provides a communications apparatus, for example, an SMF. The apparatus may be a session management network element, or may be a chip in the session management network element. The apparatus may include a processing unit, a sending unit, and a receiving unit. It should be understood that the sending unit and the receiving unit herein may alternatively be a transceiver unit. When the apparatus is the session management network element, the processing unit may be a processor, and the sending unit and the receiving unit may be the transceiver. The session management network element may further include a storage unit, and the storage unit may be a memory. The storage unit is configured to store instructions, and the processing unit executes the instructions stored in the storage unit, to enable the session management network element to perform the method according to any one of the first aspect or the possible designs of the first aspect, the method according to any one of the fourth aspect or the possible designs of the fourth aspect, or the method according to the eighth aspect. When the apparatus is the chip in the session management network element, the processing unit may be a processor, and the sending unit and the receiving unit may be an input/output interface, a pin, a circuit, or the like. The processing unit executes instructions stored in a storage unit, to enable the chip to perform the method according to any one of the first aspect or the possible designs of the first aspect, or the method according to any one of the fourth aspect or the possible designs of the fourth aspect. The storage unit is configured to store the instructions. The storage unit may be a storage unit (for example, a register or a cache) in the chip, or may be a storage unit (for example, a read-only memory or a random access memory) that is in the session management network element and that is located outside the chip.

According to a twelfth aspect, an embodiment of this application provides a communications apparatus, for example, a RAN or a UPF. The apparatus may be a first communications apparatus, or may be a chip in the first communications apparatus, or the apparatus may be a second communications apparatus, or may be a chip in the second communications apparatus. The apparatus may include a processing unit, a sending unit, and a receiving unit. It should be understood that the sending unit and the receiving unit herein may alternatively be a transceiver unit. When the apparatus is the first communications apparatus or the second communications apparatus, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, to enable the apparatus to perform the method according to any one of the second aspect or the possible designs of the second aspect, the method according to any one of the third aspect or the possible designs of the third aspect, the method according to any one of the fifth aspect or the possible designs of the fifth aspect, or the method according to any one of the sixth aspect or the possible designs of the sixth aspect. When the apparatus is the chip in the first communications apparatus or the second communications apparatus, the processing unit may be a processor, and the sending unit and the receiving unit may be an input/output interface, a pin, a circuit, or the like. The processing unit executes instructions stored in a storage unit, to enable the chip to perform the method according to any one of the second aspect or the possible designs of the second aspect, the method according to any one of the third aspect or the possible designs of the third aspect, or the method according to any one of the fifth aspect or the possible designs of the fifth aspect, or the method according to any one of the sixth aspect or the possible designs of the sixth aspect. The storage unit is configured to store the instructions. The storage unit may be a storage unit (for example, a register or a cache) in the chip, or may be a storage unit (for example, a read-only memory or a random access memory) that is in the first communications apparatus or the second communications apparatus and that is located outside the chip.

According to a thirteenth aspect, an embodiment of this application provides a communications apparatus, for example, a BP or a ULCL. The apparatus may be a traffic steering point, or may be a chip in the traffic steering point. The apparatus may include a processing unit, a sending unit, and a receiving unit. It should be understood that the sending unit and the receiving unit herein may alternatively be a transceiver unit. When the apparatus is the traffic steering point, the processing unit may be a processor, and the sending unit and the receiving unit may be a transceiver. The traffic steering point may further include a storage unit, and the storage unit may be a memory. The storage unit is configured to store instructions, and the processing unit executes the instructions stored in the storage unit, to enable the traffic steering point to perform the method according to the ninth aspect. When the apparatus is the chip in the traffic steering point, the processing unit may be a processor, and the sending unit and the receiving unit may be an input/output interface, a pin, a circuit, or the like. The processing unit executes instructions stored in a storage unit, to enable the chip to perform the method according to any one of the second aspect or the possible designs of the second aspect, the method according to any one of the third aspect or the possible designs of the third aspect, or the method according to any one of the fifth aspect or the possible designs of the fifth aspect, or the method according to any one of the sixth aspect or the possible designs of the sixth aspect. The storage unit is configured to store the instructions, and the storage unit may be a storage unit (for example, a register or cache) in the chip, or a storage unit (for example, a read-only memory or a random access memory) that is in the traffic steering point and that is located outside the chip.

According to a fourteenth aspect, an embodiment of this application further provides a computer-readable storage medium. The computer-readable storage medium stores a computer program. When the computer program is run on a computer, the computer is enabled to perform the methods according to the first aspect to the ninth aspect.

According to a fifteenth aspect, an embodiment of this application further provides a computer program product including a program. When the computer program product runs on a computer, the computer is enabled to perform the methods according to the first aspect to the ninth aspect.

DESCRIPTION OF EMBODIMENTS

The following describes the embodiments of this application with reference to the accompanying drawings.

Figure 1:
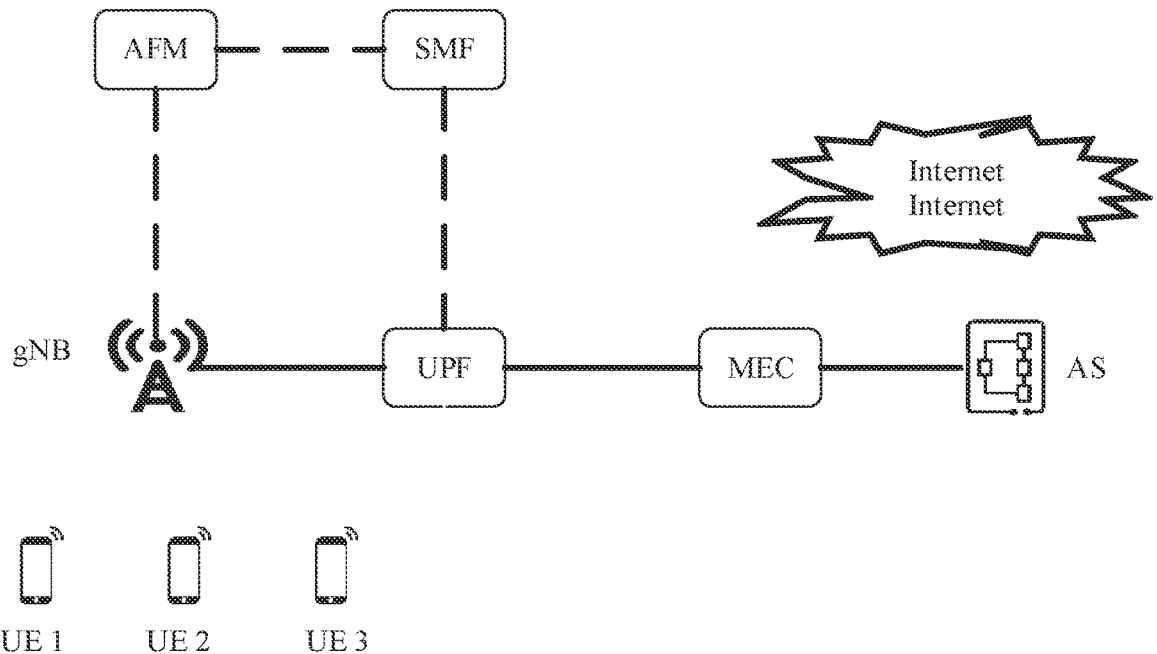
FIG. 1 is an MEC architectural diagram according to this application.
Figure 2:
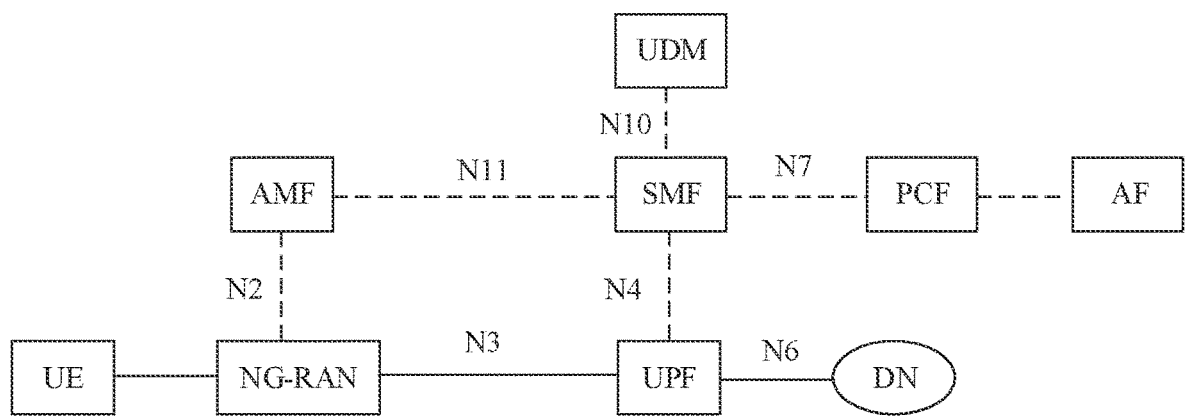
FIG. 2 is a 5G architectural diagram according to this application.

The embodiments of this application are mainly applied to a 5G system architecture. As shown in FIG. 2, the 5G system architecture is divided into two parts: an access network and a core network. A radio access network (radio access network, RAN) is used to implement functions related to radio access. The core network includes an access and mobility management network element (access and mobility management function, AMF), a session management network element (session management function, SMF), a user plane network element (user plane function, UPF), a policy control network element (policy control function, PCF), and a unified data management network element (unified data management, UDM).

As shown in FIG. 2, user equipment (User equipment, UE) in this system is not limited to a 5G network, and includes a mobile phone, a tablet computer, a computer with a wireless transceiver function, an internet of things terminal device, and the like. The UE may also be referred to as a terminal device (Terminal Equipment), a mobile station (Mobile Station), a mobile (Mobile), a remote station (Remote Station), a remote terminal (Remote Terminal), an access terminal (Access Terminal), a user terminal (User Terminal), or a user agent (User Agent). This is not limited herein. The UE may alternatively be a vehicle in vehicle-to-vehicle (Vehicle-to-vehicle, V2V) communication, a machine in machine type communication, or the like.

The RAN in this system refers to a device that provides radio access for the UE, and may include various forms of base stations, for example, a macro base station, a micro base station (also referred to as a small cell), a relay station, an access point, an evolved NodeB (eNodeB), a wireless fidelity access point (wireless fidelity access point, Wi-Fi AP), and a worldwide interoperability for microwave access base station (worldwide interoperability for microwave access base station, WiMAX BS). In systems that use different radio access technologies, names of a device that has a wireless access function may be different. For example, the device is referred to as an evolved NodeB (evolved NodeB, eNB or eNodeB) in an LTE system, the device is referred to as a NodeB (NodeB) in a 3rd generation (3rd generation, 3G) system, and the device is referred to as a gNB (gNodeB) in a next-generation system.

The AMF in this system is mainly responsible for mobility management in a mobile network, for example, location update of a user, registration of the user with a network, and a user handover. The AMF network element may also be referred to as an AMF device or an AMF entity.

The SMF in this system is mainly responsible for session management in the mobile network, for example, session establishment, modification, and release. Specific functions may include allocating an IP address to a user, selecting a UPF that provides a packet forwarding function, and so on. The SMF network element may also be referred to as an SMF device or an SMF entity.

The PCF in this system is responsible for providing a policy for the AMF and the SMF, for example, a quality of service (quality of service, QoS) policy and a slice selection policy. The PCF network element may also be referred to as a PCF device or a PCF entity.

The UPF in this system is mainly responsible for processing a user packet, for example, forwarding and charging. The UPF network element may also be referred to as a UPF device or a UPF entity.

An application function (application function, AF) in this system is responsible for providing a service for a 3GPP network, for example, affecting service routing, and interacting with the PCF to perform policy control.

The UE accesses a data network (Data Network, DN) by establishing a session (PDU session) that passes through the UE, the RAN, the UPF, and the DN. The DN refers to a carrier network that provides a data transmission service for the user, such as an IP multimedia service (IP Multi-media Service, IMS) or the internet.

The foregoing network elements may be network elements implemented on special-purpose hardware, or may be software instances running on special-purpose hardware, or instances of virtualized functions on an appropriate platform. For example, a virtualization platform may be a cloud platform.

In addition, the embodiments of this application are further applicable to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to similar technical problems.

That user plane information is congestion information is used as an example, and a plurality of congestion information reporting solutions are provided in the conventional technology.

Figure 3:
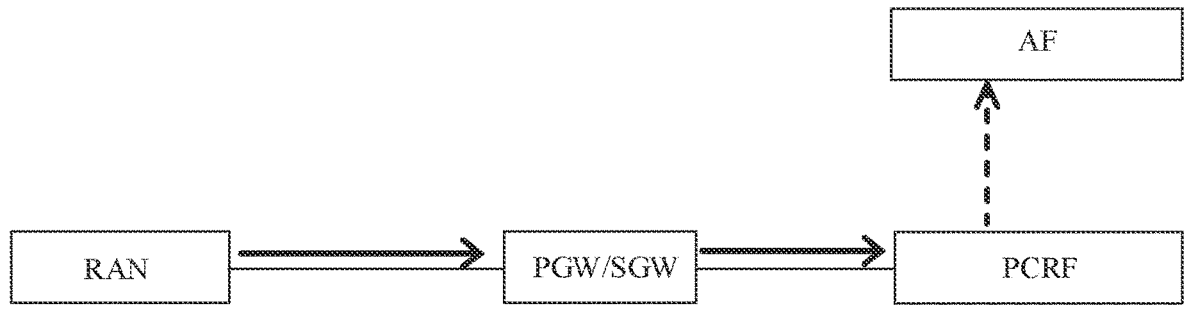
FIG. 3 is a schematic diagram of an existing solution 1 for reporting congestion information according to this application.

Solution 1: In a 4G system architecture, a general packet radio service tunneling protocol-user plane header (GTP-U header) may be extended, that is, congestion information is carried in the GTP-U header, to report the congestion information. As shown in FIG. 3, when congestion is detected in a RAN cell, the RAN includes congestion information and a cell identifier in a GTP-U header in uplink data. When a serving gateway (serving gateway, SGW) or a public data network gateway (public data network gateway, PGW) receives the uplink data, the GTP-U header is detected to obtain the congestion information. Further, the SGW reports the congestion information to a policy and charging rules function unit (policy and charging rules function, PCRF), and the PCRF may also report the congestion information to the AF. However, in the solution 1, the GTP-U protocol needs to be extended, and the SGW needs to detect a received GTP-U packet (packet), to determine whether a GTP-U header of the GTP-U packet includes the congestion information. Therefore, user plane logic complexity of the SGW increases.

Solution 2: Congestion information is reported by setting an explicit congestion notification (explicit congestion notification, ECN) in an IP header. When congestion is detected by the RAN, the RAN sets the ECN in the IP header to "11", and then sends a packet to an application server (application server, AS). However, the solution 2 requires the RAN to parse the packet, and perform parsing on at least an IP layer. However, from the perspective of security, a third party does not expect that the RAN can learn of service information. The foregoing manner of setting the ECN is also only applicable to an IP packet. When a MAC packet, that is, a layer-2 packet, is transmitted, the solution 2 is not applicable.

To avoid problems in the foregoing solution 1 and solution 2, the embodiments of this application provide a user plane information reporting method, to improve user plane information reporting efficiency. In the embodiments of this application, the uplink data may also be described as an uplink packet or an uplink service flow. Downlink data may also be described as a downlink packet or a downlink service flow. User plane information in the embodiments of this application may be reported by the RAN or reported by the UPF. The user plane information may be specifically notification information, congestion information, a packet loss rate, delay information, or bandwidth information. The bandwidth information is bandwidth information of a network for transmitting data, or a length of a buffer of a first communications apparatus. The notification information may be specifically a service flow identifier (QoS flow identifier, QFI), and is used to indicate that a QoS requirement of a service flow corresponding to the QFI cannot be met or is met again. The congestion information may be specifically a congestion level. The packet loss rate may be specifically a packet loss status of a packet. The delay may be specifically a delay corresponding to packet transmission on an air interface. Determining user plane information in the embodiments of this application may be at least one of determining that the QoS requirement of the service flow cannot be met or is met again, determining the congestion level, determining the packet loss rate of the packet, or determining the transmission delay of the packet on the air interface.

A reporting condition in the embodiments of this application refers to meeting any one or more of the following cases: (1) The QoS requirement of the service flow of the UE cannot be met. (2) The QoS requirement of the service flow of the UE is met again. (3) The packet loss rate of the packet of the service flow of the UE reaches a specific value. (4) The transmission delay of the packet of the service flow of the UE on the air interface reaches a specific value. (5) A periodic reporting time is reached. It should be understood that the user plane information may further include other content. This is merely an example herein and is not intended to limit the embodiments of this application. Similarly, the reporting condition may also include another condition, and the reporting conditions listed above are not intended to limit the embodiments of this application.

Embodiment 1

Figure 4:
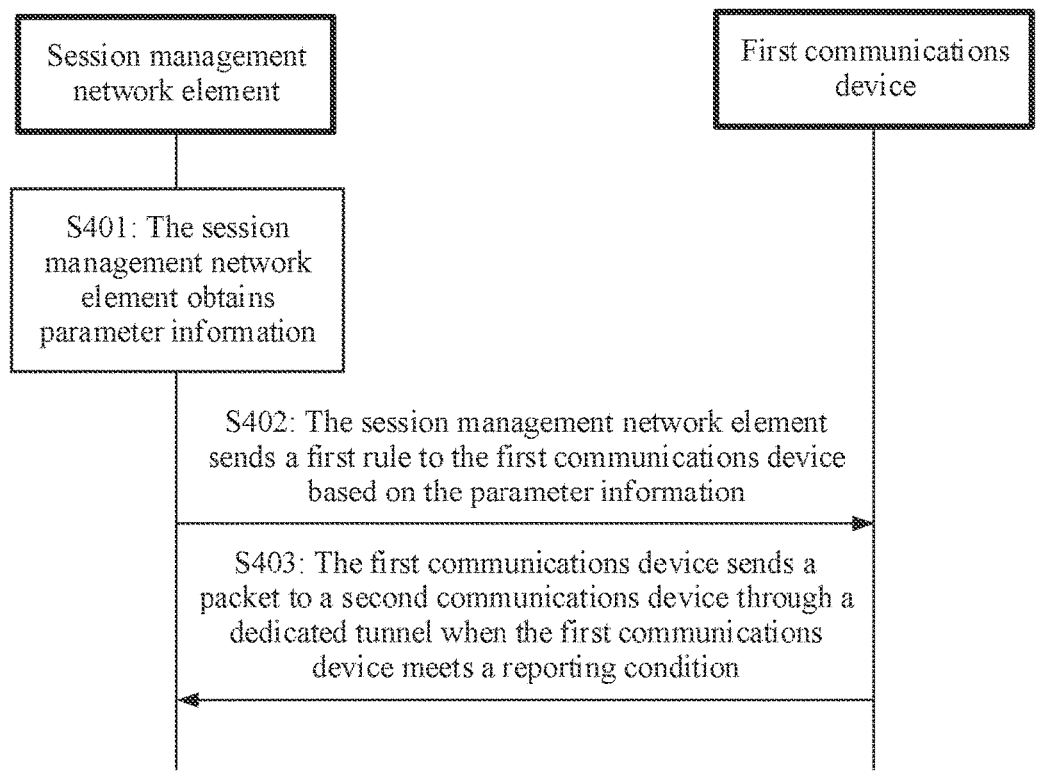
FIG. 4 is a first overview flowchart of a user plane information reporting method according to this application.

This embodiment of this application provides a user plane information reporting method. As shown in FIG. 4, the method includes the following steps.

S401: A session management network element obtains parameter information, and the session management network element initiates establishment of a dedicated tunnel between a first communications apparatus and a second communications apparatus, where the dedicated tunnel is used to transmit user plane information, and the parameter information is used by the session management network element to indicate the first communications apparatus to report the user plane information when a reporting condition is met.

If the first communications apparatus is an access network element, the second communications apparatus is a user plane network element; or if the first communications apparatus is a user plane network element, the second communications apparatus is an access network element.

The session management network element may obtain the parameter information in, but not limited to, the following three possible manners:

Method 1: The session management network element obtains the parameter information according to a configuration policy. The configuration policy herein may be preconfigured.

Method 2: The session management network element receives the parameter information from a policy control network element. In this case, the policy control network element generates the parameter information according to a preconfigured policy and sends the parameter information to the session management network element.

Method 3: The session management network element receives the parameter information from an application function network element by using a policy control network element.

For example, the AF sends an application function request (AF request) to the PCF, where the application function request carries the parameter information. Optionally, the application function request further carries service information. The service information herein may include an IP 5-tuple, an IP 3-tuple, an application identifier (APP ID), or the like. The AF may directly interact with the PCF, or may interact with the PCF by using a network exposure function network element (network exposure function, NEF). The PCF generates a new policy rule based on the application function request and sends a session policy update message to the SMF. The session policy update message carries the parameter information. Optionally, the session policy update message further carries the service information.

It can be learned from the foregoing that, compared with the method 1 and the method 2 in which the policies are already configured, in the method 3, the AF can dynamically modify a session policy, so that higher flexibility is achieved.

Further, after the session management network element obtains the parameter information, the session management network element initiates the establishment of the dedicated tunnel between the user plane network element and the access network element. The dedicated tunnel herein may also be referred to as a special tunnel, a congestion tunnel, or the like. It should be understood that before the session management network element initiates the establishment of the dedicated tunnel between the user plane network element and the access network element, there is an existing tunnel (referred to as an N3 tunnel for short below) between the user plane network element and the access network element, and the N3 tunnel is used to transmit a service flow packet. For a method for initiating the establishment of the dedicated tunnel by the session management network element, refer to a method for initiating establishment of the N3 tunnel by the session management network element.

For example, the SMF sends an N4 session modification request to the UPF, and the UPF returns an N4 session modification response, where the N4 session modification response carries user plane tunnel information (CN tunnel info) allocated by the UPF. Alternatively, the CN tunnel info may be allocated by the SMF. When the SMF allocates the CN tunnel info, the N4 session modification request carries the CN tunnel info. The SMF sends an N2 session request to a RAN through by using the AMF, where the N2 session request carries the CN tunnel info. The RAN returns an N2 session response to the SMF through the AMF, where the N2 session response carries RAN tunnel info. The SMF sends an N4 session modification request to the UPF, where the N4 session modification request carries the RAN tunnel info. At this point, establishment of a two-way dedicated tunnel between the RAN and the UPF is completed. Certainly, in a possible design, the SMF may also initiate establishment of a one-way dedicated tunnel between the RAN and the UPF. For example, when the RAN is only required to report the user plane information, the RAN only needs to obtain user plane tunnel information (that is, CN tunnel info) of the UPF, that is, only an uplink dedicated tunnel between the RAN and the UPF needs to be established. When the UPF is only required to report the user plane information, the UPF only needs to obtain tunnel information (that is, RAN tunnel info) of the RAN, that is, only a downlink dedicated tunnel between the RAN and the UPF needs to be established.

S402: The session management network element sends a first rule to the first communications apparatus based on the parameter information, where the first rule is used to indicate the first communications apparatus to send a packet to the second communications apparatus through the dedicated tunnel when the reporting condition is met. The packet is used to indicate the user plane information. In an implementation, the first rule may be user plane tunnel information, for example, CN tunnel info allocated by the UPF or the SMF, or indication information.

In a possible design, the session management network element sends a tunnel establishment request message to the first communications apparatus, where the tunnel establishment request message includes the first rule. If the first communications apparatus is the access network element, the second communications apparatus is the user plane network element, and the tunnel establishment request message may be an N2 session request. If the first communications apparatus is the user plane network element, the second communications apparatus is the access network element, and the tunnel establishment request message may be an N4 session modification request.

S403: The first communications apparatus sends the packet to the second communications apparatus through the dedicated tunnel when the reporting condition is met.

It should be understood that the packet sent by the first communications apparatus to the second communications apparatus may be a service flow packet or a packet generated by the first communications apparatus. If the packet is the packet generated by the first communications apparatus, the session management network element sends indication information to the first communications apparatus, where the indication information is used to indicate the first communications apparatus to generate the packet when the reporting condition is met.

For example, when the RAN is congested or the RAN detects that the packet loss rate reaches a specific value, the first communications apparatus generates an uplink packet, where the uplink packet is used to indicate the user plane information. In a possible implementation, the uplink packet is an empty packet. In a possible implementation, a part of the user plane information may be placed in a packet header, for example, a QFI is a special value, and the other part of the user plane information such as a current air interface delay size and a congestion level may be placed in metadata (metadata) of the packet. In a possible implementation, the QFI in the packet header is empty, and other user plane information such as the current air interface delay size and the congestion level may be placed in the metadata of the packet. In a possible implementation, the QFI in the packet header is empty or a special value, and does not include other user plane information.

In a possible design, an uplink direction and the packet generated by the first communications apparatus are used as an example, that is, the first communications apparatus is the RAN, the second communications apparatus is the UPF, and the uplink packet generated by the RAN includes the user plane information. The user plane information includes at least one of the following: notification information, congestion information, a packet loss rate, a delay, and the like. The notification information may be specifically a QFI. The congestion information may be specifically a congestion level. The packet loss rate may be specifically a packet loss status of a packet. The delay may be specifically a delay corresponding to packet transmission on an air interface. The RAN sends the packet to the UPF through the dedicated tunnel.

For example, if the RAN detects that a QoS requirement of a QoS flow of UE, for example, a delay or a packet loss rate cannot be met, the RAN generates an uplink packet, where the packet includes a QFI. The QFI is used to identify the QoS flow. Further, the packet further includes delay or packet loss rate information.

For another example, if the RAN detects that congestion occurs in a cell accessed by the UE or congestion occurs in the RAN, that is, a QoS requirement of none of QoS flows of the UE can be met, the RAN generates an uplink packet. The packet does not include a QFI, a QFI included in the packet is empty, or a QFI included in the packet is a special value. That a QFI is not included, or that a QFI is empty, or that a QFI is a special value, is used to indicate that the QoS requirement of none of the QoS flows of the UE can be met. Further, the packet further includes delay or packet loss rate information.

In a possible design, an uplink direction and a service flow packet sent by the first communications apparatus are used as an example, that is, the first communications apparatus is the RAN, the second communications apparatus is the UPF, and the service flow packet sent by the RAN is a service flow packet of the UE. When the RAN determines that the reporting condition for the user plane information is met, the RAN waits for the service flow packet sent by the UE to the RAN, and sends the service flow packet to the UPF through the dedicated tunnel.

For example, if the RAN detects that a QoS requirement of a QoS flow of the UE, for example, a delay or a packet loss rate cannot be met, the RAN waits for the service flow packet sent by the UE to the RAN, and sends the service flow packet to the UPF through the dedicated tunnel instead of sending the service flow packet to the UPF through an N3 tunnel between the RAN and the UPF. The service flow packet includes a QFI, used to identify the QoS flow. Further, the packet further includes delay or packet loss rate information.

For another example, the RAN detects that congestion occurs in a cell accessed by the UE or congestion occurs in the RAN, that is, a QoS requirement of none of QoS flows of the UE cannot be met, the RAN waits for the service flow packet sent by the UE, and modifies a QFI in the service flow packet. For example, the service flow packet is modified, so that the service flow packet does not include a QFI, or a QFI included in the service flow packet is empty, or a QFI included in the service flow packet is a special value. That a QFI is not included, or that a QFI is empty, or that a QFI is a special value, is used to indicate that the QoS requirement of none of the QoS flows of the UE can be met. Then, the RAN sends a modified service flow packet to the UPF through the dedicated tunnel. In another implementation, the RAN waits for the service flow packet sent by the UE, and sends the service flow packet to the UPF through the dedicated tunnel, that is, the QFI in the service flow packet is not modified. In other words, the RAN sends, to the UPF through a congestion tunnel, each received service flow packet sent by the UE, which indicates that the QoS requirement of none of the QoS flows of the UE can be met. Further, the packet further includes delay or packet loss rate information.

A downlink direction and the packet generated by the first communications apparatus are used as an example, that is, the first communications apparatus is the UPF, the second communications apparatus is the RAN, and a downlink packet generated by the UPF includes user plane information. The user plane information includes at least one of the following: notification information, congestion information, a packet loss rate, a delay, and the like. The notification information may be specifically a QFI. The congestion information may be specifically a congestion level. The packet loss rate may be specifically a packet loss status of a packet. The delay may be specifically a delay corresponding to packet transmission on an air interface. The UPF sends the packet to the RAN through the dedicated tunnel.

For example, if the UPF detects that a QoS requirement of a QoS flow of the UE, for example, a delay or a packet loss rate cannot be met, the UPF generates an uplink packet, where the packet includes a QFI. The QFI is used to identify the QoS flow. Further, the packet further includes delay or packet loss rate information.

For another example, if the UPF detects that congestion occurs in the UPF or the UPF is overloaded, that is, a QoS requirement of none of QoS flows of the UE can be met, the UPF generates an uplink packet. The packet does not include a QFI, a QFI included in the packet is empty, or a QFI included in the packet is a special value. That a QFI is not included, or that a QFI is empty, or that a QFI is a special value, is used to indicate that the QoS requirement of none of the QoS flows of the UE can be met. Further, the packet further includes delay or packet loss rate information.

Similarly, a downlink direction and a service flow packet sent by the first communications apparatus are used as an example, that is, the first communications apparatus is the UPF, the second communications apparatus is the RAN, and the service flow packet sent by the UPF is a service flow packet of the AF or an AS. When the UPF determines that the reporting condition for the user plane information is met, the UPF waits for the service flow packet sent by the AF or the AS to the UPF, and sends the service flow packet to the RAN through the dedicated tunnel.

In addition, in a possible design, the session management network element sends a third rule to the first communications apparatus, where the third rule is used to indicate the first communications apparatus to send the service flow packet to the second communications apparatus through a tunnel other than the dedicated tunnel when the reporting condition is not met. For example, the first communications apparatus is the RAN, and the second communications apparatus is the UPF. If the RAN determines that there is no congestion, the RAN transmits uplink data or downlink data through an N3 tunnel established in a session establishment process. If congestion is detected by the RAN, the RAN transmits congestion information through a dedicated N3 tunnel. For example, when congestion is detected by the RAN, the RAN may transmit the service flow packet through the dedicated N3 tunnel. Alternatively, when congestion is detected by the RAN, the RAN may generate an uplink packet, and transmit the generated uplink packet through the dedicated N3 tunnel. If a packet header of the generated uplink packet includes a QFI, it indicates that the RAN detects that a QoS feature of the QFI meets the reporting condition. If the packet header does not include a QFI or a QFI is empty or a special symbol, it indicates that congestion occurs in the RAN or a RAN cell accessed by the UE.

In a possible design, the session management network element sends a second rule to the second communications apparatus, where the second rule is used to indicate the second communications apparatus to send the user plane information to a third communications apparatus when the second communications apparatus receives the packet from the first communications apparatus through the dedicated tunnel. The second rule may be indication information. Therefore, when the second communications apparatus receives the packet from the first communications apparatus through the dedicated tunnel, the second communications apparatus may determine the user plane information, and send the user plane information to a third communications apparatus in time. In addition, the second communications apparatus does not need to detect whether the packet includes the user plane information, thereby simplifying a logical function of the second communications apparatus. Specifically, if the first communications apparatus is the access network element, the second communications apparatus is the user plane network element, and the third communications apparatus is the policy control network element or the application function network element. For example, the policy control network element or the application function network element can learn of the user plane information in time and perform policy adjustment in time. If the first communications apparatus is the user plane network element, the second communications apparatus is the access network element, and the third communications apparatus is a terminal apparatus. According to the foregoing design, the user plane information can be quickly reported to the third communications apparatus, so that the third communications apparatus adjusts a policy, a packet transmission rate, an encoding rate, or the like based on the user plane information, thereby ensuring transmission quality of a user plane packet and ensuring user experience of the terminal apparatus.

According to the foregoing design, the first communications apparatus sends the packet to the second communications apparatus through the dedicated tunnel when the reporting condition is met. When the second communications apparatus receives the packet from the first communications apparatus through the dedicated tunnel, the second communications apparatus may determine the user plane information, and send the user plane information to the third communications apparatus in time. In addition, the second communications apparatus does not need to always detect whether the packet includes the user plane information, and only needs to detect whether the packet is received through the dedicated tunnel, thereby simplifying the logical function of the second communications apparatus. In addition, the foregoing design is applicable to both an IP packet and a MAC packet. Therefore, the foregoing design is more widely applied.

Embodiment 2

Figure 5:
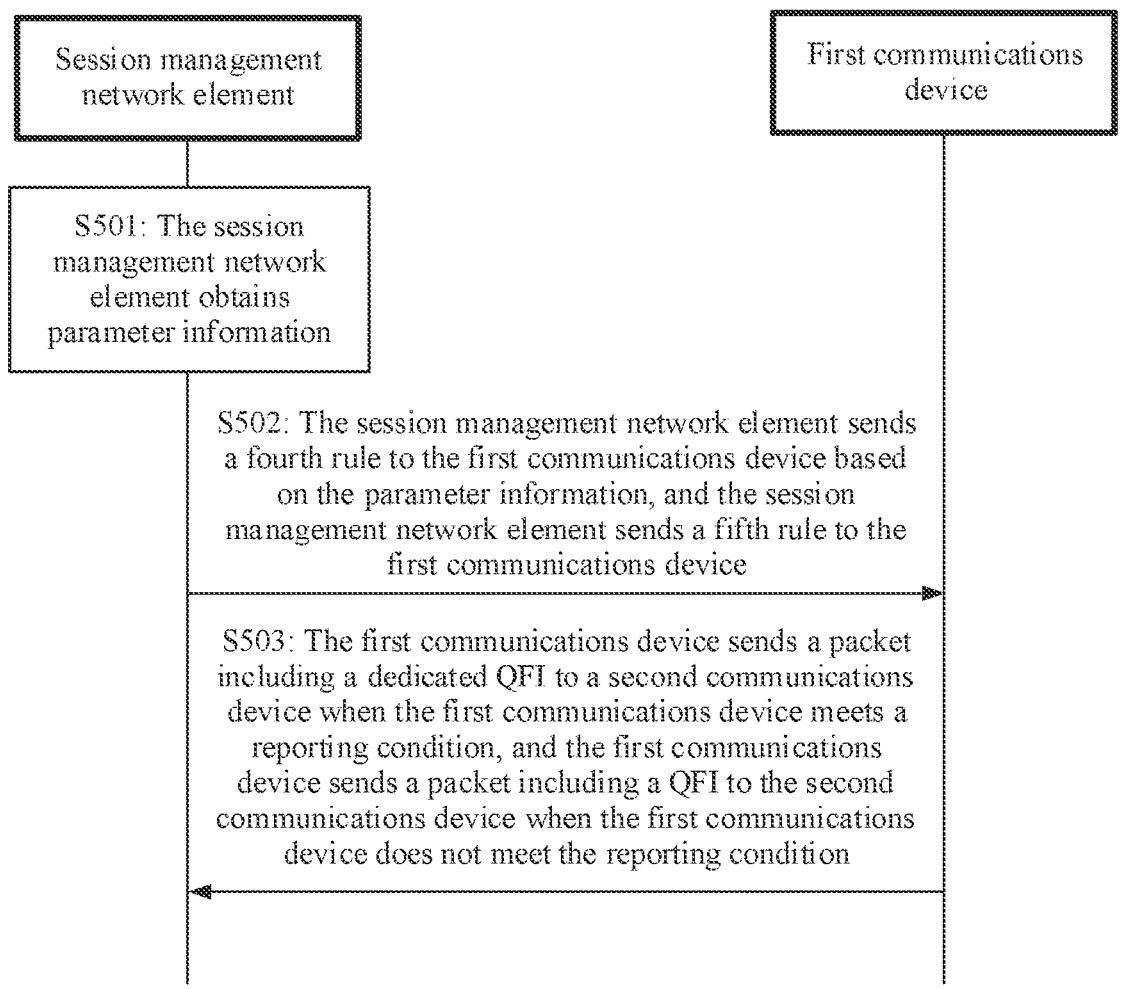
FIG. 5 is a second overview flowchart of a user plane information reporting method according to this application.

This embodiment of this application provides a user plane information reporting method. As shown in FIG. 5, the method includes the following steps.

S501: A session management network element obtains parameter information, where the parameter information is used by the session management network element to indicate a first communications apparatus to report user plane information when a reporting condition is met.

If the first communications apparatus is an access network element, a second communications apparatus is a user plane network element; or if the first communications apparatus is a user plane network element, a second communications apparatus is an access network element.

The session management network element may obtain the parameter information in, but not limited to, the following three possible manners:

Method 1: The session management network element obtains the parameter information according to a configuration policy. The configuration policy herein may be preconfigured.

Method 2: The session management network element receives the parameter information from a policy control network element. In this case, the policy control network element generates the parameter information according to a preconfigured policy and sends the parameter information to the session management network element.

Method 3: The session management network element receives the parameter information from an application function network element by using a policy control network element.

For example, the AF sends an application function request to the PCF, where the application function request carries the parameter information. Optionally, the application function request further carries service information. The service information herein may include an IP 5-tuple, an IP 3-tuple, an application identifier, or the like. The AF may directly interact with the PCF, or may interact with the PCF by using a NEF. The PCF generates a new policy rule based on the application function request and sends a session policy update message to the SMF. The session policy update message carries the parameter information. Optionally, the session policy update message further carries the service information.

It can be learned from the foregoing that, compared with the method 1 and the method 2 in which the policies are already configured, in the method 3, the AF can dynamically modify a session policy, so that higher flexibility is achieved.

S502: The session management network element sends a fourth rule to the first communications apparatus based on the parameter information, where the fourth rule is used to indicate the first communications apparatus to send a packet including a dedicated QFI to the second communications apparatus when the reporting condition is met, and the packet including the dedicated QFI is used to indicate the user plane information. The session management network element further sends a fifth rule to the first communications apparatus, where the fifth rule is used to indicate the first communications apparatus to send a packet including a QFI to the second communications apparatus when the reporting condition is not met.

The fourth rule and the fifth rule may be a same rule, or may be different rules.

S503: The first communications apparatus sends the packet including the dedicated QFI to the second communications apparatus when the reporting condition is met, and the first communications apparatus sends a packet including a QFI to the second communications apparatus when the reporting condition is not met.

It should be understood that, the packet sent by the first communications apparatus to the second communications apparatus when the reporting condition is met may be a service flow packet or a packet generated by the first communications apparatus. If the packet is the packet generated by the first communications apparatus, the session management network element sends indication information to the first communications apparatus, where the indication information is used to indicate the first communications apparatus to generate the packet when the reporting condition is met. The packet sent by the first communications apparatus to the second communications apparatus when the reporting condition is not met is the service flow packet.

For example, when a RAN is congested or a RAN detects that a packet loss rate reaches a specific value, the first communications apparatus generates an uplink packet, where the uplink packet is used to indicate the user plane information. In a possible implementation, a part of the user plane information may be placed in a packet header, for example, a dedicated QFI. In this case, the dedicated QFI may be a special value. The other part of the user plane information such as a current air interface delay size and a congestion level may be placed in metadata (metadata) of the packet. In a possible implementation, the dedicated QFI in the packet header is a special value and does not include other user plane information.

In a possible design, the session management network element sends a sixth rule to the second communications apparatus, where the sixth rule is used to indicate the second communications apparatus to send the user plane information to a third communications apparatus when the second communications apparatus receives the packet including the dedicated QFI from the first communications apparatus. Specifically, if the first communications apparatus is the access network element, the second communications apparatus is the user plane network element, and the third communications apparatus is the policy control network element or the application function network element; or if the first communications apparatus is the user plane network element, the second communications apparatus is the access network element, and the third communications apparatus is a terminal apparatus.

Further, in a possible design, the session management network element sends a correspondence between a dedicated QFI and a QFI to the first communications apparatus and the second communications apparatus. For example, the AF sends the AF request to the PCF, where the AF request carries the service information and the parameter information. The PCF sends the session policy update message to the SMF, where the message carries the service information and the parameter information. The SMF determines, based on the service information, QoS flows that require congestion reporting, and allocates dedicated QFIs to these QoS flows. The SMF further sends the correspondence between the dedicated QFI and the QFI to the RAN and the UPF. Specifically, the SMF sends the correspondence between the QFI and the dedicated QFI to the UPF by using an N4 session modification message or an N4 session establishment message. The SMF sends the correspondence between the QFI and the dedicated QFI to the RAN by using the AMF. Specifically, the SMF sends the correspondence between the QFI and the dedicated QFI to the AMF by using an N11 interface message. The AMF forwards the correspondence between the QFI and the dedicated QFI to the RAN by using an N2 session request.

In this case, the fourth rule is used to indicate the first communications apparatus to send a packet including a dedicated QFI corresponding to a QFI of a first service flow to the second communications apparatus when the first communications apparatus detects that the reporting condition is met for the first flow. The sixth rule is used to indicate the second communications apparatus to determine, based on the correspondence, user plane information of the QFI corresponding to the dedicated QFI, and send the user plane information to the third communications apparatus when the second communications apparatus receives the packet including the dedicated QFI.

For example, the first communications apparatus is the RAN, the second communications apparatus is the UPF, and the first communications apparatus generates a packet. When the RAN detects that the reporting condition for the user plane information is met, the RAN generates a packet, where the generated packet includes a dedicated QFI. Further, the generated packet may further include at least one of the following: notification information, congestion information, a packet loss rate, a delay, and the like. The notification information may be specifically a service flow identifier QFI. The congestion information may be specifically a congestion level. The packet loss rate may be specifically a packet loss status of a packet. The delay may be specifically a delay corresponding to packet transmission on an air interface. The RAN sends the packet to the UPF. The dedicated QFI may correspond to a QFI of UE, or may be a special value, for example, all 0s or all 1s. When the RAN detects that the reporting condition for the user plane information is not met, the RAN only sends a received service flow packet of the UE to the UPF.

For example, if the RAN detects that an air interface transmission delay of a packet of a QoS flow of the UE reaches a specific value, for example, 10 ms, the RAN generates a packet, where the generated packet includes a dedicated QFI. The dedicated QFI corresponds to the QoS flow, and is used to indicate that the air interface transmission delay of the packet of the QoS flow reaches the specific value. Further, the packet further includes delay information, that is, 10 ms.

For another example, if the RAN detects overload, that is, a packet loss rate of none of QoS flows of the UE can be met, the RAN generates a packet, where the generated packet includes a dedicated QFI. The dedicated QFI is a special value, for example, all 0s or all 1s, and is used to indicate that the packet loss rate of none of the QoS flows of the UE can be met. Further, the packet further includes packet loss rate information, for example, a statistical value of a packet loss rate.

For example, the first communications apparatus is the RAN, the second communications apparatus is the UPF, and the first communications apparatus sends the service flow packet. When the RAN detects that the reporting condition for the user plane information is met, the RAN waits to receive a service flow packet sent by the UE to the RAN, and modifies a QFI of the service flow packet, so that the service flow packet includes a dedicated QFI. Further, the service flow packet may be further added with at least one of the following information: notification information, congestion information, a packet loss rate, a delay, and the like. The notification information may be specifically a QFI. The congestion information may be specifically a congestion level. The packet loss rate may be specifically a packet loss status of a packet. The delay may be specifically a delay corresponding to packet transmission on an air interface. The RAN sends the packet to the UPF. The dedicated QFI may correspond to a QFI of the UE, or may be a special value, for example, all 0s or all 1s. When the RAN detects that the reporting condition for the user plane information is not met, the RAN does not need to perform a special operation, that is, the RAN only sends the received service flow packet of the UE to the UPF.

For example, if the RAN detects that a QoS requirement of a QoS flow of the UE cannot be met, the RAN waits for a service flow packet sent by the UE to the RAN, and modifies the service flow packet, so that the service flow packet includes a dedicated QFI. The dedicated QFI corresponds to the QoS flow, and is used to indicate that the QoS requirement of the QoS flow cannot be met. Further, the packet further includes a QoS parameter such as delay or congestion information.

For another example, if the RAN detects that a cell is overloaded or the RAN is overloaded, the RAN waits for a service flow packet sent by the UE to the RAN, and modifies the service flow packet, so that the service flow packet includes a dedicated QFI. The dedicated QFI is a special value, and is used to indicate that a QoS requirement of none of QoS flows of the UE can be met. Further, the packet further includes a QoS parameter such as delay or congestion information.

Similarly, when the first communications apparatus is the UPF, the second communications apparatus is the RAN, refer to the foregoing embodiment in which the first communications apparatus is the RAN and the second communications apparatus is the UPF. Details are not described herein again.

In addition, in a possible design, the correspondence between the dedicated QFI and the QFI may also be configured for the first communications apparatus and the second communications apparatus in advance. In another possible design, the dedicated QFI may alternatively be implemented through QFI encoding. For example, two parts are included during QFI encoding: a QFI and a dedicated QFI. When the first communications apparatus determines that the reporting condition is not met, a QFI in a packet header is a QFI corresponding to a service flow, and a dedicated QFI is a special value, for example, all 0s or all 1s. When the first communications apparatus determines that the reporting condition is met, a QFI in a packet header is a special value, for example, all 0s or all 1s, and a dedicated QFI is a QFI corresponding to a service flow. Therefore, when the UPF receives a packet, the UPF determines a user plane status of the RAN based on a QFI in a packet header. For example, when the QFI in the packet header is a special value and a dedicated QFI is a non-special value (that is, a QFI corresponding to a service packet), it indicates that a QoS flow corresponding to the QFI cannot meet a QoS requirement. For another example, when the QFI in the packet header is a non-special value (that is, a QFI corresponding to a service packet), and a dedicated QFI is a special value, it indicates that a QoS flow corresponding to the QFI meets a QoS requirement.

According to the foregoing design, when the reporting condition is met, the first communications apparatus sends the packet including the dedicated QFI to the second communications apparatus. When the second communications apparatus receives the packet including the dedicated QFI from the first communications apparatus, the second communications apparatus may determine the user plane information, and send the user plane information to a third communications apparatus in time. In this embodiment of this application, reporting of the user plane information uses an existing packet header protocol of the packet. Compared with the conventional technology, there is no need to extend a GTP-U protocol, thereby simplifying a protocol design. In addition, the foregoing design is applicable to both an IP packet and a MAC packet. Therefore, compared with the conventional technology, the foregoing design is more widely applied.

Embodiment 3

Figure 6:
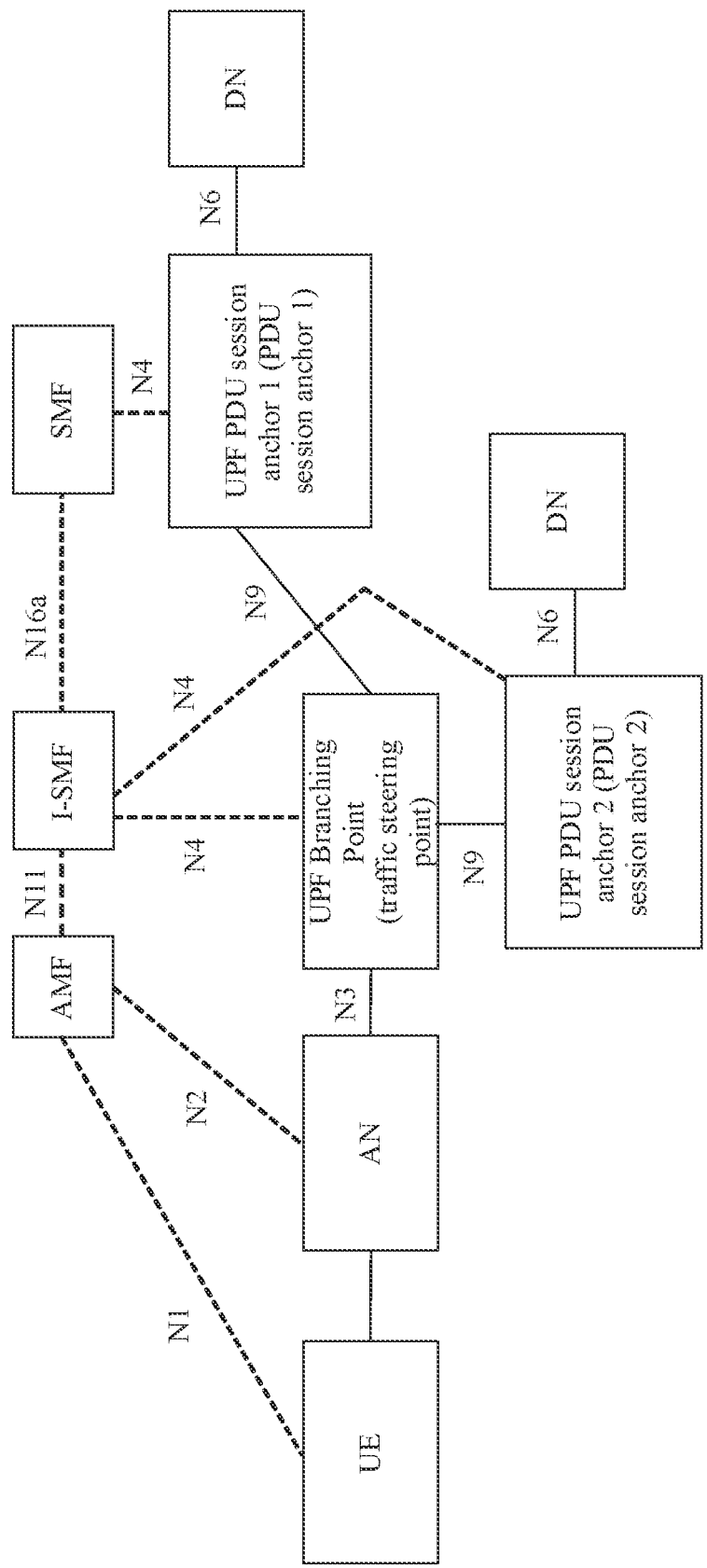
FIG. 6 is a schematic diagram of a traffic steering scenario according to this application.

In 5G, some service flows in a session may be distributed to local routes in a traffic steering manner. In a traffic steering manner, a traffic steering point is inserted on a user plane path of the session. Specifically, a traffic steering point may be an uplink classifier (uplink classifier, ULCL) or a branching point (BP, Branching point). As shown in FIG. 6, a BP is used as an example. One session of UE has a plurality of anchors. Such a session is referred to as a multi-homed session (multi-homed PDU session). For an uplink service flow (upLink, UL), the BP sends the received UL service flow to different anchors according to a forwarding rule. For a downlink service flow (downlink, DL), the BP sends the DL service flow to the UE according to the forwarding rule.

A session management network element sends a seventh rule to the traffic steering point, where the seventh rule indicates the traffic steering point to separately send received user plane information to a local anchor and a remote anchor. The user plane information indicates that all service flows of a terminal apparatus cannot meet a requirement.

It should be noted that the solution in this embodiment of this application is applicable to a scenario in which none of service flows of the terminal apparatus can meet the requirement, for example, congestion occurs in all QoS flows of the UE because a RAN is congested or a RAN cell is congested, or an air interface delay cannot meet a delay requirement of a service flow of the UE due to some reason, or all or none of QoS flows of the UE can meet a QoS requirement. In other words, the solution in this embodiment of this application is not applicable to congestion of a service flow. For example, in a scenario in which a service flow is congested, the SMF does not need to deliver the seventh rule to the ULCL/BP. When the ULCL or the BP receives the uplink service flow, the ULCL or the BP sends the uplink service flow to a corresponding anchor according to the forwarding rule.

Figure 7:
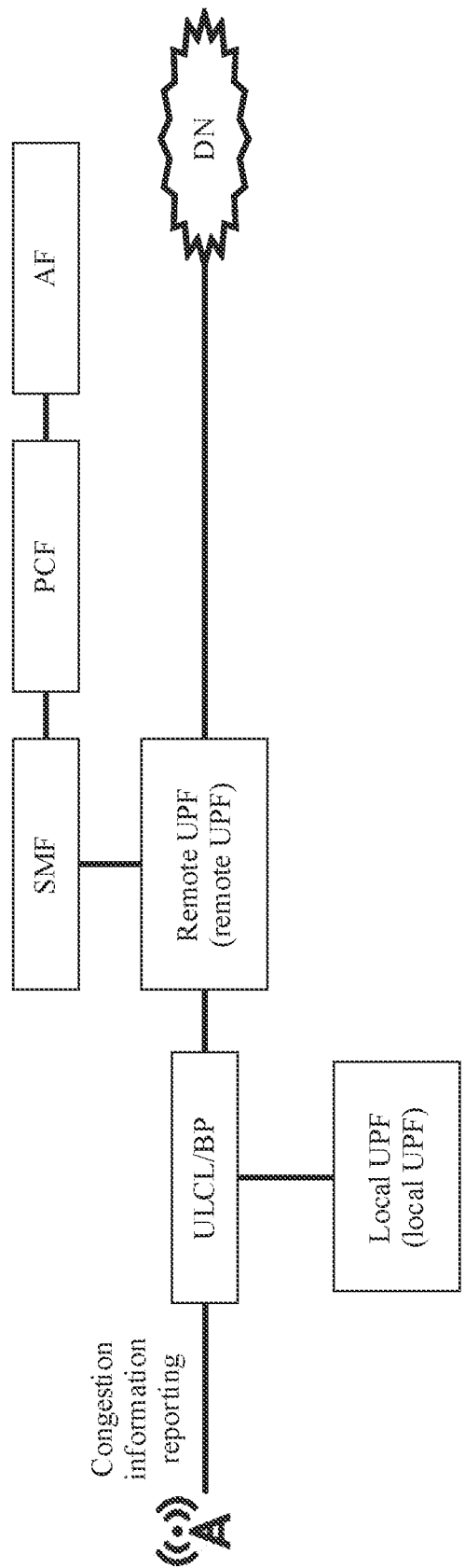
FIG. 7 is a schematic diagram of reporting user plane information in a traffic steering scenario according to this application.

For example, the SMF initiates an N4 session modification process to the ULCL or the BP, where an N4 session modification request carries the seventh rule, and the seventh rule indicates the ULCL or the BP to separately send user plane information to a local PDU session anchor (local PDU session anchor, local PSA) and a remote PDU session anchor (remote PDU session anchor, remote PSA) when the ULCL or the BP receives a packet from the RAN and determines the user plane information, as shown in FIG. 7.

For example, when the user plane information is congestion information, assuming that the RAN detects that packet congestion of all QoS flows of the UE reaches a specific value because a cell is overloaded or the RAN is overloaded, the RAN sends a packet to the branching point. After receiving the packet from the RAN, the traffic steering point determines that the packet congestion of all the QoS flows of the UE reaches the specific value, and the traffic steering point duplicates the packet, and separately sends the packet to the local PSA and the remote PSA, so that the local PSA and the remote PSA determine the user plane information. Therefore, the user plane information may be sent to an AF, a PCF, or an AS. Further, the packet may further include a congestion level.

For example, when the user plane information is a delay, assuming that the RAN detects that air interface transmission delays of packets of all QoS flows of the UE reach a specific value because a cell is overloaded or the RAN is overloaded, the RAN sends a packet to the traffic steering point. After receiving the packet from the RAN, the traffic steering point determines that the air interface transmission delays of the packets of all the QoS flows of the UE reach the specific value, and the traffic steering point duplicates the packet, and separately sends the packet to the local PSA and the remote PSA, so that the local PSA and the remote PSA determine the user plane information. Therefore, the user plane information may be sent to the AF, the PCF, or the AS. Further, the packet may further include a congestion level.

Similarly, when the user plane information is a packet loss rate, the description is similar to the foregoing description, and details are not described herein again.

For example, the ULCL or the BP may determine the user plane information in the following solutions:

Solution 1: The RAN may send a packet to the ULCL or the BP through a dedicated tunnel by using the method provided in Embodiment 1. If the ULCL or the BP receives the packet through the dedicated tunnel, and the packet does not include a QFI or a QFI is empty or a QFI is a special symbol, it is determined that congestion occurs in the RAN or in the RAN cell.

Solution 2: The RAN may send a packet including a special congestion QFI to the ULCL or the BP by using the method provided in Embodiment 2. If the packet received by the ULCL or the BP includes the special congestion QFI, it is determined that congestion occurs in the RAN or in the RAN cell.

It should be understood that the RAN may send the packet to the traffic steering point in the foregoing manner of this application, that is, the RAN sends the packet to the traffic steering point through the dedicated tunnel or by using a dedicated QFI, or the RAN may send the packet to the traffic steering point through GTP-U extension in the conventional technology. A manner in which the RAN sends the packet to the traffic steering point is not limited herein.

The foregoing method can resolve a congestion reporting problem in a traffic steering scenario, and ensure timely reporting of the user plane information.

The following describes this embodiment of this application with reference to specific accompanying drawings.

Figure 8:
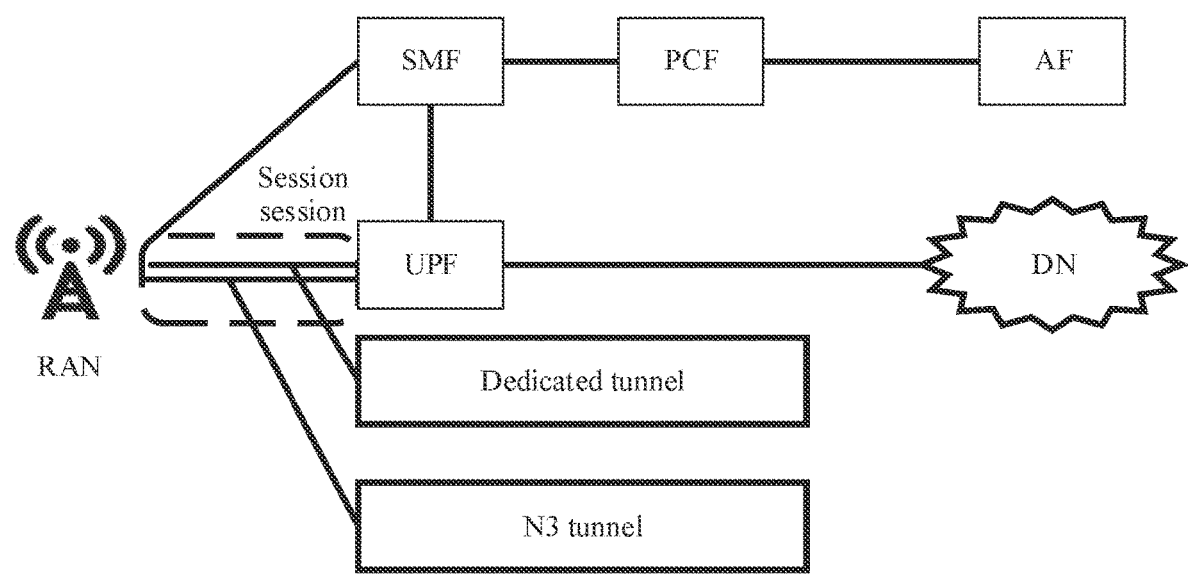
FIG. 8 is a schematic diagram of reporting congestion information by a RAN by using a method according to Embodiment 1 of this application.
Figure 9:
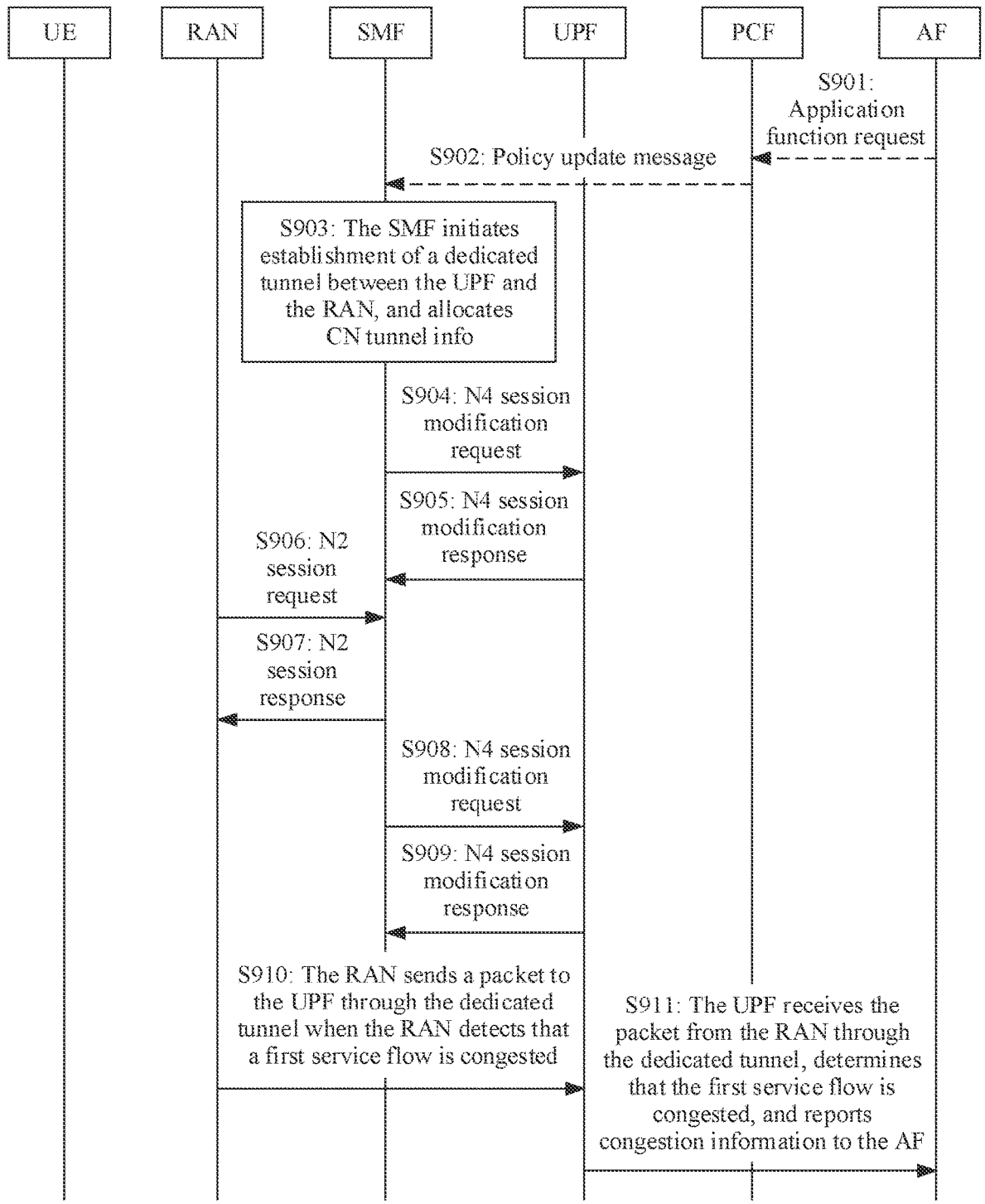
FIG. 9 is a flowchart of a method for reporting congestion information by a RAN by using a method according to Embodiment 1 of this application.

FIG. 8 and FIG. 9 are schematic diagrams of reporting congestion information by the RAN. The user plane information is the congestion information, the first communications apparatus is the RAN, and the second communications apparatus is the UPF.

S901: The AF sends an application function request to the PCF, where the application function request carries parameter information. Optionally, the application function request further carries service information.

It should be noted that the parameter information is used by the SMF to indicate the RAN to report the congestion information.

Optionally, the AF may further carry direction information, used to indicate an uplink direction or a downlink direction. It should be understood that the direction information and the parameter information may be represented by an information element.

S902: The PCF sends a session policy update message to the SMF, where the session policy update message carries the parameter information. Optionally, the session policy update message further carries the service information.

S903: The SMF initiates establishment of a dedicated tunnel between the UPF and the RAN, and allocates CN tunnel info.

The dedicated tunnel is associated with a PDU session corresponding to the service information.

It should be understood that the CN tunnel info refers to user plane tunnel information corresponding to the dedicated tunnel. The CN tunnel info may alternatively be allocated by the UPF. This is merely an example herein.

S904: The SMF sends an N4 session modification request to the UPF, where the N4 session modification request carries the CN tunnel info.

S905: The UPF sends an N4 session modification response to the SMF.

It should be understood that, when the UPF allocates the user plane tunnel information, this step includes the CN tunnel info corresponding to the dedicated tunnel in step S903.

S906: The SMF sends an N2 session request to the RAN, where the N2 session request carries the CN tunnel info, a first rule, and a third rule.

The first rule is used to indicate the RAN to send a packet to the UPF through the dedicated tunnel when congestion is detected by the RAN.

The third rule is used to indicate the RAN to send the packet to the UPF through an N3 tunnel other than the dedicated tunnel when no congestion is detected by the RAN. The third rule may alternatively be indication information. Optionally, when the first rule is not received, the RAN transmits the packet through a non-dedicated tunnel by default.

S907: The RAN sends an N2 session response to the SMF, where optionally, the N2 session response carries AN tunnel info.

The AN tunnel info is air interface tunnel information corresponding to the dedicated tunnel allocated by the RAN. When only uplink congestion reporting is enabled, the RAN does not need to allocate the air interface tunnel information corresponding to the dedicated tunnel.

S908: The SMF sends an N4 session modification request to the UPF, where the N4 session modification request carries the AN tunnel info and a second rule.

The second rule is used to indicate the UPF to determine the congestion information, and send the congestion information to the AF when the UPF receives the packet from the RAN through the dedicated tunnel.

S909: The UPF sends an N4 session modification response to the SMF.

It should be understood that the foregoing S903 to S909 are an establishment process of the dedicated tunnel between the RAN and the UPF.

S910: When the RAN detects that a first service flow is congested, the RAN sends a packet to the UPF through the dedicated tunnel.

The first service flow may be a service flow in the PDU session corresponding to the service information. The packet includes a dedicated QFI corresponding to the first service flow. In addition, the packet may be a first service flow packet or a packet generated by the RAN. If the packet is the packet generated by the RAN, in S906, the SMF sends indication information to the RAN, where the indication information is used to indicate the RAN to generate the packet when congestion is detected by the RAN, where the generated packet includes the QFI and the congestion information.

S911: The UPF receives the packet from the RAN through the dedicated tunnel, determines that the first service flow is congested, and reports the congestion information to the AF.

Figure 10:
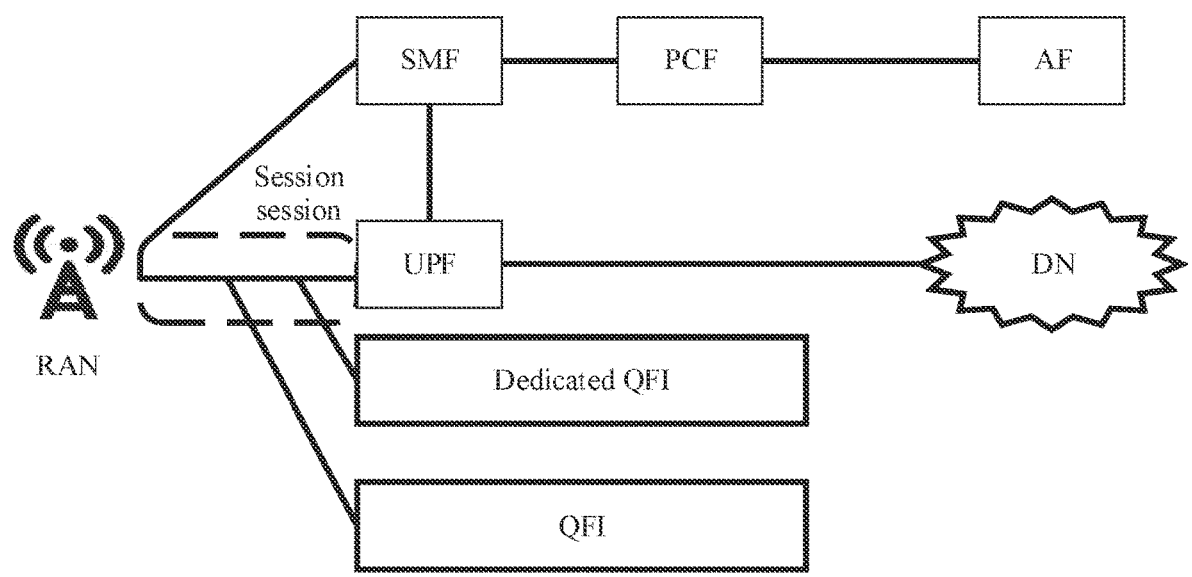
FIG. 10 is a schematic diagram of reporting congestion information by a RAN by using a method according to Embodiment 2 of this application.
Figure 11:
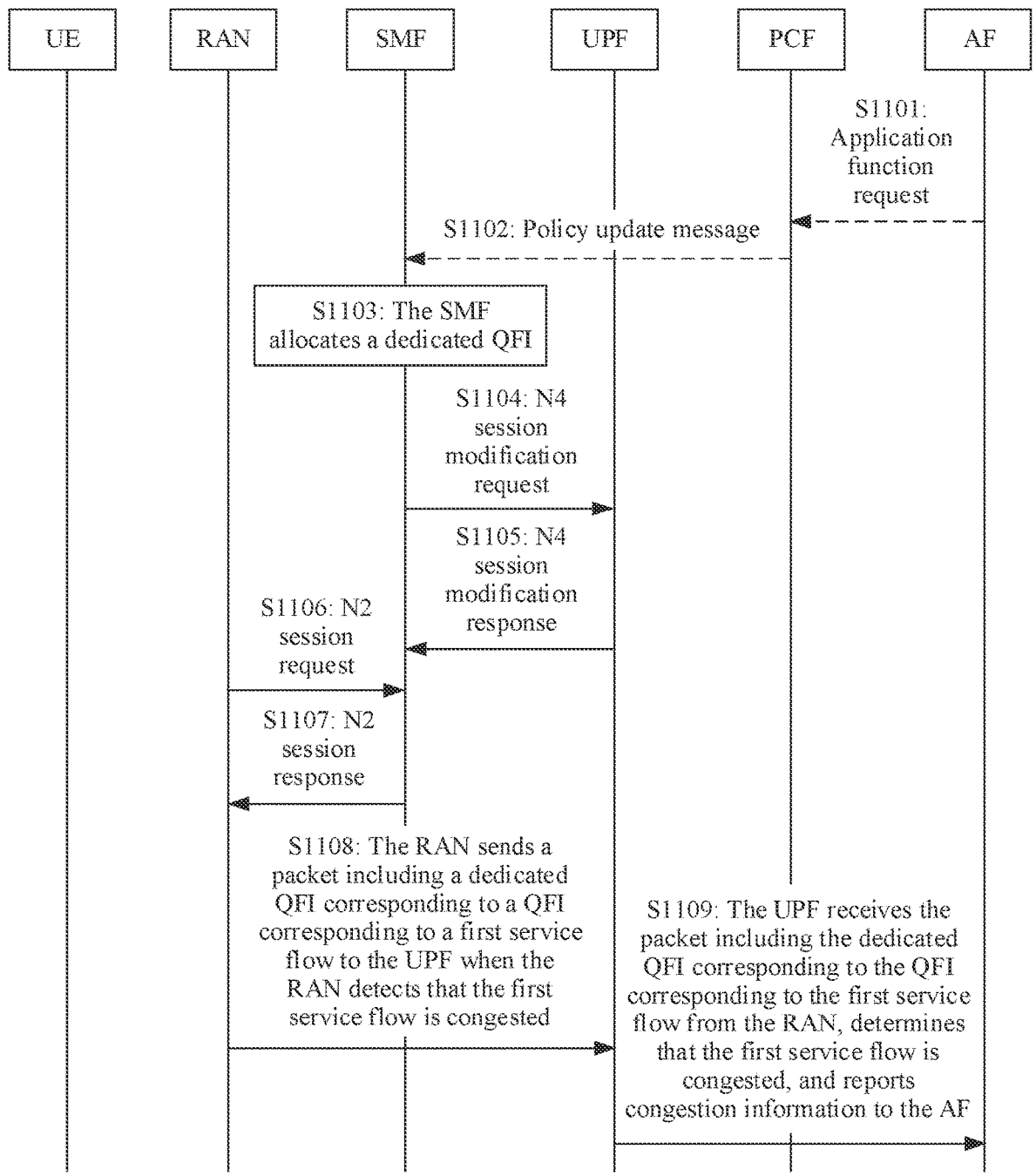
FIG. 11 is a flowchart of a method for reporting congestion information by a RAN by using a method according to Embodiment 2 of this application.

FIG. 10 and FIG. 11 are schematic diagrams of reporting congestion information by the RAN. The user plane information is the congestion information, the first communications apparatus is the RAN, and the second communications apparatus is the UPF.

S1101: The AF sends an application function request to the PCF, where the application function request carries parameter information. Optionally, the application function request further carries service information.

S1102: The PCF sends a session policy update message to the SMF, where the session policy update message carries the parameter information. Optionally, the session policy update message further carries the service information.

S1103: The SMF allocates a dedicated QFI.

The SMF determines, based on the service information, QoS flows that require congestion reporting, and allocates dedicated QFIs to these QoS flows.

S1104: The SMF sends an N4 session modification request to the UPF, where the N4 session modification request carries a correspondence between a dedicated QFI and a QFI and a sixth rule.

The sixth rule is used to indicate the UPF to determine a service flow that is congested, and send congestion information to the AF by using the PCF when the UPF receives a packet including a dedicated QFI from the RAN. The sixth rule may alternatively be indication information.

S1105: The UPF sends an N4 session modification response to the SMF.

S1106: The SMF sends an N2 session request to the RAN.

Optionally, the N2 session request carries the correspondence between the dedicated QFI and the QFI, a fourth rule, and a fifth rule.

The fourth rule is used to indicate the RAN to send a packet including a dedicated QFI corresponding to a congested service flow to the UPF when the RAN detects that any service flow in the QoS flows that require congestion reporting is congested. The fourth rule may be indication information.

The fifth rule is used to indicate the RAN to send a packet including a QFI to the UPF when the RAN does not detect that a service flow in the QoS flows that require congestion reporting is congested. The fifth rule may be indication information. Optionally, when the fourth rule is not received, the RAN sends a packet including a QFI to the UPF by default.

Optionally, the N2 session request carries the fourth rule and the fifth rule. The fourth rule is used to indicate the correspondence between the dedicated QFI and the QFI. The fifth rule is used to indicate the RAN to send a packet including a QFI to the UPF when the RAN does not detect that a service flow in the QoS flows that require congestion reporting is congested.

S1107: The RAN sends an N2 session response to the SMF.

S1108: The RAN sends a packet including a dedicated QFI corresponding to a QFI corresponding to a first service flow to the UPF when the RAN detects that the first service flow is congested.

The first service flow is any service flow in the QoS flows that require congestion reporting. In addition, the packet may be a first service flow packet or a packet generated by the RAN. If the packet is the packet generated by the RAN, in step S1106, the SMF sends indication information to the RAN, where the indication information is used to indicate the RAN to generate the packet when the RAN detects that any service flow in the QoS flows that require congestion reporting is congested.

S1109: The UPF receives the packet including the dedicated QFI corresponding to the QFI corresponding to the first service flow from the RAN, determines that the first service flow is congested, and reports the congestion information to the AF.

Figure 12:
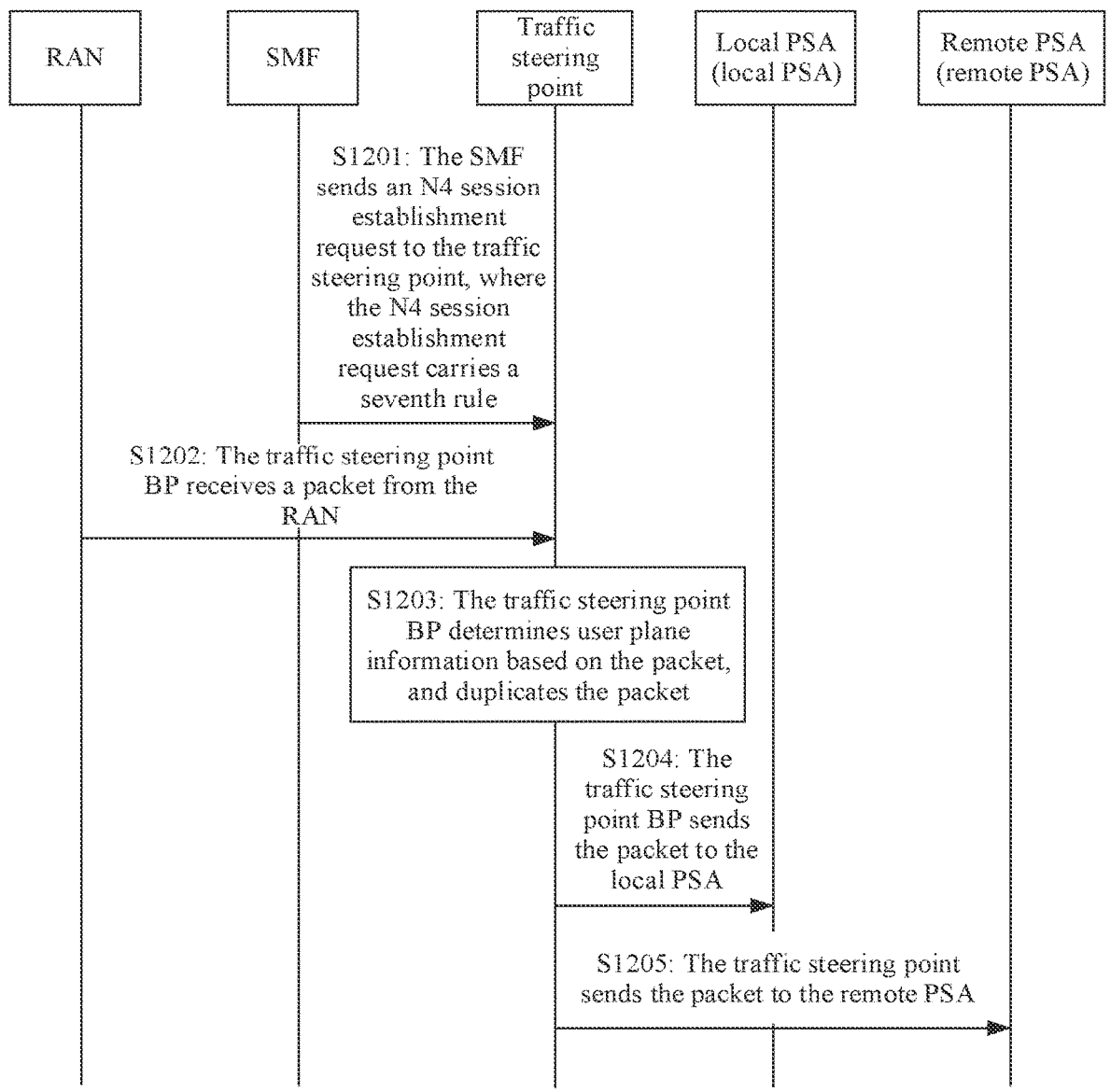
FIG. 12 is a flowchart of a method for reporting user plane information in a traffic steering scenario by using a method according to Embodiment 2 of this application.

FIG. 12 is a schematic diagram of reporting congestion information by the traffic steering point.

S1201: The SMF sends an N4 session establishment request to the traffic steering point, where the N4 session establishment request carries a seventh rule.

The seventh rule is used to indicate the traffic steering point to duplicate a packet received from the RAN, and separately send the packets to the local PSA and the remote PSA when the traffic steering point receives the packet from the RAN and determines that the RAN is congested or the RAN cell is congested, that is, when the RAN determines that user plane information of none of QoS flows of the UE can be met. The seventh rule may alternatively be indication information.

S1202: The traffic steering point receives the packet from the RAN.

S1203: The traffic steering point determines user plane information based on the packet, and duplicates the packet.

It should be understood that, for packet transmission between the RAN and the traffic steering point described in S1201 and S1202, refer to the method described in Embodiment 1 or Embodiment 2. In other words, when the reporting condition for the user plane information is met, the packet is transmitted through a dedicated tunnel between the RAN and the traffic steering point. Alternatively, a dedicated QFI is added to a packet header to transmit the packet to the UPF.

S1204: The traffic steering point sends the packet to the local PSA.

S1205: The traffic steering point sends the packet to the remote PSA.

It should be understood that there is no sequence between S1203 and S1204.

In the foregoing embodiments provided in this application, various solutions of the communication method provided in the embodiments of this application are separately described from perspectives of each network element and interaction between the network elements. It may be understood that, to implement the foregoing functions, each network element and apparatus include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
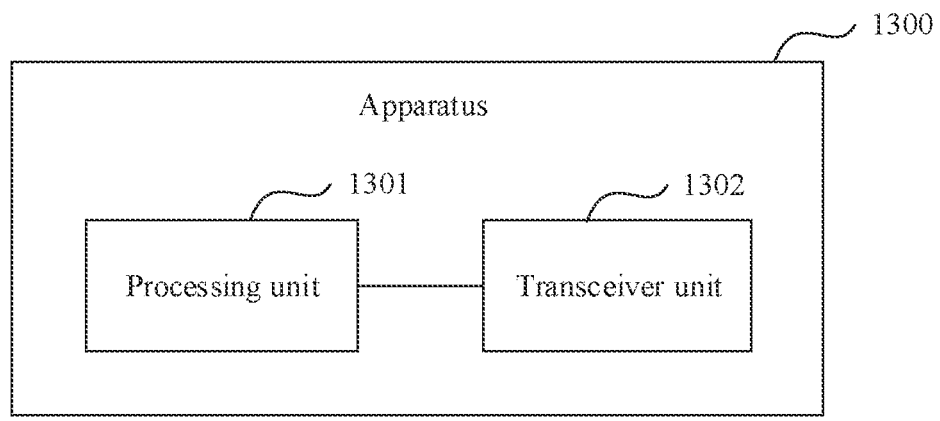
FIG. 13 is a first schematic diagram of a structure of an apparatus according to this application.

Same as the foregoing idea, as shown in FIG. 13, an embodiment of this application further provides an apparatus 1300. The apparatus 1300 includes a transceiver unit 1302 and a processing unit 1301.

In an example, the apparatus 1300 is configured to implement a function of the session management network element in the foregoing method. The apparatus may be an SMF, or may be an apparatus in the SMF, for example, a chip system.

The processing unit 1301 obtains parameter information, and initiates establishment of a dedicated tunnel between a first communications apparatus and a second communications apparatus, where the dedicated tunnel is used to transmit user plane information, and the parameter information is used by the session management network element to indicate the first communications apparatus to report the user plane information when a reporting condition is met.

The processing unit 1301 sends a first rule to the first communications apparatus by using the transceiver unit 1302 based on the parameter information, where the first rule is used to indicate the first communications apparatus to send a packet to the second communications apparatus through the dedicated tunnel when the reporting condition is met, and the packet is used to indicate the user plane information.

In an example, the apparatus 1300 is configured to implement a function of the first communications apparatus in the foregoing method. The apparatus may be a RAN or a UPF, or may be an apparatus in the RAN or the UPF, for example, a chip system.

The processing unit 1301 invokes the transceiver unit 1302 to perform the step: receiving a first rule from a session management network element, where the first rule is used to indicate the first communications apparatus to send a packet to a second communications apparatus through a dedicated tunnel when the reporting condition is met, and the packet is used to indicate the user plane information.

The processing unit 1301 invokes the transceiver unit 1302 to perform the step: sending the packet to the second communications apparatus through the dedicated tunnel when the reporting condition is met.

In an example, the apparatus 1300 is configured to implement a function of the second communications apparatus in the foregoing method. The apparatus may be a RAN or a UPF, or may be an apparatus in the RAN or the UPF, for example, a chip system.

The transceiver unit 1302 receives a second rule from a session management network element, where the second rule is used to indicate the second communications apparatus to send user plane information to a third communications apparatus when the second communications apparatus receives a packet from the first communications apparatus through a dedicated tunnel, and the packet is used to indicate the user plane information.

When the processing unit 1301 receives the packet from the first communications apparatus through the dedicated tunnel, the processing unit 1301 determines the user plane information, and sends the user plane information to the third communications apparatus by using the transceiver unit 1302.

In an example, the apparatus 1300 is configured to implement a function of the session management network element in the foregoing method. The apparatus may be an SMF, or may be an apparatus in the SMF, for example, a chip system.

The processing unit 1301 obtains the parameter information, where the parameter information is used by the session management network element to indicate a first communications apparatus to report user plane information when a reporting condition is met.

The processing unit 1301 sends a fourth rule to the first communications apparatus based on the parameter information by using the transceiver unit 1302, where the fourth rule is used to indicate the first communications apparatus to send a packet including a dedicated quality of service flow identifier QFI to a second communications apparatus when the reporting condition is met, and the packet including the dedicated QFI is used to indicate the user plane information.

The transceiver unit 1302 sends a fifth rule to the first communications apparatus, where the fifth rule is used to indicate the first communications apparatus to send a packet including a QFI to the second communications apparatus when the reporting condition is met.

In an example, the apparatus 1300 is configured to implement a function of the first communications apparatus in the foregoing method. The apparatus may be a RAN or a UPF, or may be an apparatus in the RAN or the UPF, for example, a chip system.

The transceiver unit 1302 receives a fourth rule and a fifth rule from a session management network element, where the fourth rule is used to indicate the first communications apparatus to send a packet including a dedicated QFI to the second communications apparatus when a reporting condition is met, the packet including the dedicated QFI is used to indicate user plane information, and the fifth rule is used to indicate the first communications apparatus to send a packet including a QFI to the second communications apparatus when the reporting condition is not met.

The processing unit 1301 invokes the transceiver unit 1302 to perform the step: sending the packet including the dedicated QFI to the second communications apparatus when the reporting condition is met.

The processing unit 1301 invokes the transceiver unit 1302 to perform the step: sending a packet including a QFI to the second communications apparatus when the reporting condition is not met.

In an example, the apparatus 1300 is configured to implement a function of the second communications apparatus in the foregoing method. The apparatus may be a RAN or a UPF, or may be an apparatus in the RAN or the UPF, for example, a chip system.

The processing unit 1301 invokes the transceiver unit 1302 to perform the step: receiving a sixth rule from a session management network element, where the sixth rule is used to indicate the second communications apparatus to send user plane information to a third communications apparatus when the second communications apparatus receives a packet including a dedicated QFI from a first communications apparatus, and the packet including the dedicated QFI is used to indicate the user plane information.

The processing unit 1301 invokes the transceiver unit 1302 to perform the step: determining the user plane information, and sending the user plane information to the third communications apparatus when the packet including the dedicated QFI is received from the first communications apparatus.

For specific execution processes of the processing unit 1301 and the transceiver unit 1302, refer to the descriptions in the foregoing method embodiments. In the embodiments of this application, division into modules is an example, and is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

In another optional variation, the apparatus may be a chip system. In the embodiments of this application, the chip system may include a chip, or may include a chip and another discrete component. For example, the apparatus includes a processor and an interface, and the interface may be an input/output interface. The processor implements functions of the processing unit 1301, and the interface implements functions of the transceiver unit 1302. The apparatus may further include a memory. The memory is configured to store a program that can be run on a processor. When the processor executes the program, the methods in the foregoing embodiments are performed.

Figure 14:
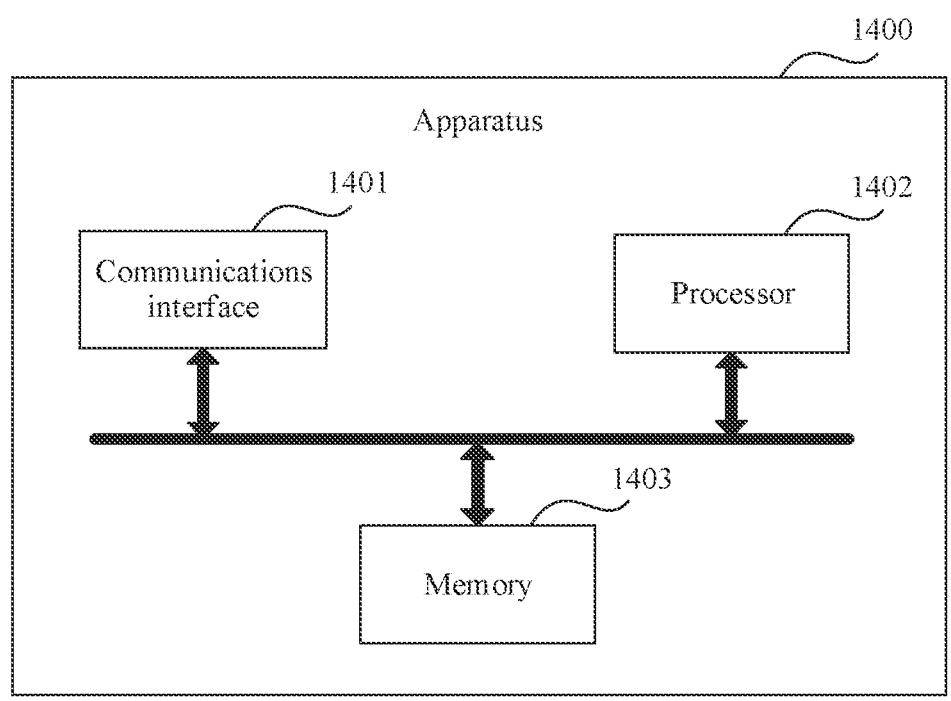
FIG. 14 is a second schematic diagram of a structure of an apparatus according to this application.

Same as the foregoing idea, as shown in FIG. 14, an embodiment of this application further provides an apparatus 1400. The apparatus 1400 includes a communications interface 1401, at least one processor 1402, and at least one memory 1403. The communications interface 1401 is configured to communicate with another device by using a transmission medium, so that an apparatus in the apparatus 1400 can communicate with the another device. The memory 1403 is configured to store a computer program. The processor 1402 invokes the computer program stored in the memory 1403, to send and receive data by using the communications interface 1401, to implement the method in the foregoing embodiment.

For example, when the apparatus is a session management network element, the memory 1403 is configured to store a computer program. The processor 1402 invokes the computer program stored in the memory 1403, and performs, by using the communications interface 1401, the method performed by the session management network element in the foregoing embodiment. When the apparatus is a first communications apparatus, the memory 1403 is configured to store a computer program. The processor 1402 invokes the computer program stored in the memory 1403, and performs, by using the communications interface 1401, the method performed by the first communications apparatus in the foregoing embodiment. When the apparatus is a second communications apparatus, the memory 1403 is configured to store a computer program. The processor 1402 invokes the computer program stored in the memory 1403, and performs, by using the communications interface 1401, the method performed by the second communications apparatus in the foregoing embodiment.

In this embodiment of this application, the communications interface 1401 may be a transceiver, a circuit, a bus, a module, or a communications interface of another type. The processor 1402 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor. The memory 1403 may be a nonvolatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function. The memory 1403 is coupled to the processor 1402. Coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 1403 may alternatively be located outside the apparatus 1400. The processor 1402 may operate in collaboration with the memory 1403. The processor 1402 may execute program instructions stored in the memory 1403. At least one of the at least one memory 1403 may alternatively be included in the processor 1402. A specific connection medium between the communications interface 1401, the processor 1402, and the memory 1403 is not limited in this embodiment of this application. For example, in this embodiment of this application, the memory 1403, the processor 1402, and the communications interface 1401 may be connected through a bus in FIG. 14. The bus may be classified into an address bus, a data bus, a control bus, or the like.

It may be understood that the apparatus in the embodiment shown in FIG. 13 may be implemented by the apparatus 1400 shown in FIG. 14. Specifically, the processing unit 1301 may be implemented by the processor 1402, and the transceiver unit 1302 may be implemented by the communications interface 1401.

An embodiment of this application further provides a computer-readable storage medium. The computer-readable storage medium stores a computer program. When the computer program is run on a computer, the computer is enabled to perform the method according to the foregoing embodiments.

All or some of the methods provided in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD for short)), a semiconductor medium (for example, a solid state disk Solid State Disk, SSD), or the like.

The foregoing embodiments are merely used to describe the technical solutions of this application in detail. The descriptions of the foregoing embodiments are merely intended to help understand the method of the embodiments of the present invention, and shall not be construed as a limitation on the embodiments of the present invention. Variations or replacements readily figured out by a person skilled in the art shall fall within the protection scope of the embodiments of the present invention.

What is claimed is:

1. A user plane information reporting method, comprising:
   obtaining, by a session management network element, parameter information, wherein the parameter information is used by the session management network element to indicate a first communications apparatus to report user plane information when a reporting condition is met;
   initiating, by the session management network element, establishment of a dedicated tunnel between the first communications apparatus and a second communications apparatus, wherein the dedicated tunnel is used to transmit the user plane information; and
   sending, by the session management network element, a first rule to the first communications apparatus based on the parameter information, wherein the first rule indicates the first communications apparatus to send a packet to the second communications apparatus through the dedicated tunnel when the reporting condition is met, and each packet received through the dedicated tunnel indicates to the second communications apparatus that the received packet includes the user plane information reported by the first communications apparatus.

2. The method according to claim 1, wherein the method further comprises:
   sending, by the session management network element, a second rule to the second communications apparatus, wherein the second rule indicates the second communications apparatus to send the user plane information to a third communications apparatus when the second communications apparatus receives the packet from the first communications apparatus through the dedicated tunnel.

3. The method according to claim 1, wherein the method further comprises:
   sending, by the session management network element, a third rule to the first communications apparatus, wherein the third rule indicates the first communications apparatus to send a service flow packet to the second communications apparatus through a tunnel other than the dedicated tunnel when the reporting condition is not met.

4. The method according to claim 1, wherein the packet is a service flow packet or a packet generated by the first communications apparatus.

5. The method according to claim 4, wherein the packet is the packet generated by the first communications apparatus, and the method further comprises:
   sending, by the session management network element, indication information to the first communications apparatus, wherein the indication information indicates the first communications apparatus to generate the packet when the reporting condition is met.

6. The method according to claim 1, wherein the obtaining, by a session management network element, parameter information comprises:
   receiving, by the session management network element, the parameter information from an application function network element by using a policy control network element.

7. The method according to claim 1, wherein the user plane information comprises at least one of notification information, congestion information, a packet loss rate, or delay information.

8. The method according to claim 1, wherein:
   the first communications apparatus is an access network element, and the second communications apparatus is a user plane network element; or
   the first communications apparatus is a user plane network element, and the second communications apparatus is an access network element.

9. The method according to claim 2, wherein the first communications apparatus is an access network element, the second communications apparatus is a user plane network element, and the third communications apparatus is a policy control network element or an application function network element; or
   the first communications apparatus is the user plane network element, the second communications apparatus is the access network element, and the third communications apparatus is a terminal apparatus.

10. A session management network element, comprising:
    at least one processor; and
    one and one or more memories coupled to the at least one processor and storing programming instructions for execution by the at least one processor to:
       obtain parameter information, wherein the parameter information is used by the session management network element to indicate a first communications apparatus to report user plane information when a reporting condition is met;
       initiate establishment of a dedicated tunnel between the first communications apparatus and a second communications apparatus, wherein the dedicated tunnel is used to transmit the user plane information; and
       send a first rule to the first communications apparatus based on the parameter information, wherein the first rule indicates the first communications apparatus to send a packet to the second communications apparatus through the dedicated tunnel when the reporting condition is met, and each packet received through the dedicated tunnel indicates to the second communications apparatus that the received packet includes the user plane information reported by the first communications apparatus.

11. The session management network element according to claim 10, wherein the programming instructions are for execution by the at least one processor to:
    send a second rule to the second communications apparatus, wherein the second rule indicates the second communications apparatus to send the user plane information to a third communications apparatus when the second communications apparatus receives the packet from the first communications apparatus through the dedicated tunnel.

12. The session management network element according to claim 10, wherein the programming instructions are for execution by the at least one processor to:

send a third rule to the first communications apparatus, wherein the third rule indicates the first communications apparatus to send a service flow packet to the second communications apparatus through a tunnel other than the dedicated tunnel when the reporting condition is not met.

13. The session management network element according to claim 10, wherein the packet is a service flow packet or a packet generated by the first communications apparatus.

14. The session management network element according to claim 13, wherein the packet is the packet generated by the first communications apparatus, and wherein the programming instructions are for execution by the at least one processor to:

send indication information to the first communications apparatus, wherein the indication information indicates the first communications apparatus to generate the packet when the reporting condition is met.

15. The session management network element according to claim 10, wherein the obtaining parameter information comprises:

receiving the parameter information from an application function network element by using a policy control network element.

16. The session management network element according to claim 10, wherein the user plane information comprises at least one of notification information, congestion information, a packet loss rate, or delay information.

17. The session management network element according to claim 10, wherein:

the first communications apparatus is an access network element, and the second communications apparatus is a user plane network element; or the first communications apparatus is a user plane network element, and the second communications apparatus is an access network element.

18. The session management network element according to claim 11, wherein the first communications apparatus is an access network element, the second communications apparatus is a user plane network element, and the third communications apparatus is a policy control network element or an application function network element; or the first communications apparatus is the user plane network element, the second communications apparatus is the access network element, and the third communications apparatus is a terminal apparatus.

19. A non-transitory computer-readable storage media comprising instructions which, when executed by one or more processors, cause the one or more processors to perform operations comprising:

obtaining, by a session management network element, parameter information, wherein the parameter information is used by the session management network element to indicate a first communications apparatus to report user plane information when a reporting condition is met;

initiating, by the session management network element, establishment of a dedicated tunnel between the first communications apparatus and a second communications apparatus, wherein the dedicated tunnel is used to transmit the user plane information; and sending, by the session management network element, a first rule to the first communications apparatus based on the parameter information, wherein the first rule indicates the first communications apparatus to send a packet to the second communications apparatus through the dedicated tunnel when the reporting condition is met, and each packet received through the dedicated tunnel indicates to the second communications apparatus that the received packet includes the user plane information reported by the first communications apparatus.

20. The non-transitory computer-readable storage media according to claim 19, wherein the operations further comprise:

sending, by the session management network element, a second rule to the second communications apparatus, wherein the second rule indicates the second communications apparatus to send the user plane information to a third communications apparatus when the second communications apparatus receives the packet from the first communications apparatus through the dedicated tunnel.

* * * * *

UNITED STATES PATENT AND TRADEMARK OFFICE
CERTIFICATE OF CORRECTION

PATENT NO. : 11,968,565 B2
APPLICATION NO. : 17/675763
DATED : April 23, 2024
INVENTOR(S) : Yongcui Li et al.

It is certified that error appears in the above-identified patent and that said Letters Patent is hereby corrected as shown below:

In the Claims

Column 36, Line 36 (Approx.), Claim 10, before "one" please delete "one and".

Signed and Sealed this
Twenty-seventh Day of August, 2024

Katherine Kelly Vidal
*Director of the United States Patent and Trademark Office*